United States Patent [19]

Kubota et al.

[11] Patent Number: 5,398,127
[45] Date of Patent: Mar. 14, 1995

[54] ACTIVE MATRIX TWISTED NEMATIC LIQUID CRYSTAL DISPLAY WITH RUBBING DIRECTION 1-44 DEGREES TO THE ELECTRODES

[75] Inventors: Hirofumi Kubota; Shoichi Ishihara; Hirofumi Wakemoto; Keisuke Tsuda; Hiroshi Satani, all of Osaka; Katsuji Hattori, Takarazuka, all of Japan

[73] Assignee: Matsushita Electric Industrial Co., Ltd., Osaka, Japan

[21] Appl. No.: 24,961

[22] Filed: Mar. 2, 1993

[30] Foreign Application Priority Data

Mar. 3, 1992 [JP] Japan .................................. 4-045322
Mar. 3, 1992 [JP] Japan .................................. 4-045323

[51] Int. Cl.⁶ ...................... G02F 1/1337; G02F 1/13; G02F 1343
[52] U.S. Cl. ...................................... 359/75; 359/102; 359/84; 359/77
[58] Field of Search .................. 359/102, 75, 77, 78, 359/84, 63, 54, 58

[56] References Cited

U.S. PATENT DOCUMENTS

| | | | |
|---|---|---|---|
| 4,844,569 | 7/1989 | Wada et al. | 359/63 |
| 5,099,345 | 3/1992 | Kozaki et al. | 359/78 |
| 5,106,529 | 4/1992 | Ichimura | 359/102 |
| 5,198,917 | 3/1993 | Togashi | 359/75 |
| 5,249,070 | 9/1993 | Takano | 359/75 |

FOREIGN PATENT DOCUMENTS

| | | |
|---|---|---|
| 0485017 | 10/1992 | European Pat. Off. |
| 1-035417 | 2/1989 | Japan . |
| 1-201622 | 8/1989 | Japan . |
| 3-111820 | 5/1991 | Japan . |
| 478824 | 3/1992 | Japan . |
| 4-223436 | 8/1992 | Japan . |
| 4-355723 | 12/1992 | Japan . |
| 4-355725 | 12/1992 | Japan . |

OTHER PUBLICATIONS

IBM Journal of Research and Development vol. 36, No. 1, Jan. 1992, New York US pp. 51-58 A. Lien et al. 'Lateral Field Effect in Twisted Nematic Cell'.
Philips Journal of Research vol. 34, No. 1/2, 1979, Eindhovel NL; pp. 78-87 M. Goscianski 'Hybrid Tilt Alignment for Liquid Crystal Matrix Displays'.

*Primary Examiner*—William L. Sikes
*Assistant Examiner*—Kenneth Parker
*Attorney, Agent, or Firm*—Lowe, Price, LeBlanc & Becker

[57] ABSTRACT

An active matrix type of twisted nematic liquid crystal display is provided with a lower alignment layer rubbed in rubbing directions RD3, RD4 opposite to each other, an upper alignment layer rubbed in rubbing directions RD5, RD6 opposite to each other, a liquid crystal layer arranged between the lower and upper alignment layers and filled with liquid crystal molecules set in a nematic liquid crystal phase, a pixel electrode and a common electrode for inducing a vertical electric field in the liquid crystal layer, and a source line and gate line driving a switching device for applying an electric potential to the pixel electrode. The rubbing direction on the substrate with the switching device is at an angle of 1°–44° to either the source or gate line. In this case, major axes of a group of liquid crystal molecules arranged above the pixel electrode are twisted in a clockwise direction, and major axes of other group of liquid crystal molecules are twisted in a counterclockwise direction.

16 Claims, 12 Drawing Sheets

NORMAL TILT CONDITION    REVERSE TILT CONDITION

ACTIVE MATRIX TWISTED NEMATIC LIQUID CRYSTAL DISPLAY WITH RUBBING DIRECTION 1-44 DEGREES TO THE ELECTRODES

BACKGROUND OF THE INVENTION

1. Field of the Invention

The present invention relates to an active matrix type of twisted nematic liquid crystal display in which large pieces of lights are circularly polarized by pieces of liquid crystal arranged in an orderly matrix of picture elements to display a colored image.

2. Description of the Related Art

A liquid crystal display is conventionally utilized to display a colored image. In the liquid crystal display, liquid crystal is arranged along an optical path of a piece of incident light while twisting an orientation of the liquid crystal. Therefore, the incident light is circularly polarized in the liquid crystal display.

Also, an active matrix type of twisted nematic liquid crystal display in which a large number of picture elements are arranged in an orderly matrix has been recently utilized as one of the liquid crystal displays. In each of the picture elements of the active matrix type of twisted nematic liquid crystal display, liquid crystal set in a nematic phase is filled up to twist the orientation of the liquid crystal along the optical path, and a switching device is equipped to control the orientation of the liquid crystal. The twisted nematic liquid crystal display can be easily manufactured in a thin shape, and electric power consumed to operate the twisted nematic liquid crystal display is low. In addition, a contrast between a bright light and a dark light is superior in the twisted nematic liquid crystal display. Therefore, a colored image can be displayed in a high contrast on the twisted nematic liquid crystal display. Accordingly, the twisted nematic liquid crystal display has been developed for use as a television display in place of a cathode-ray tube of the television.

2.1. Previously Proposed Art

The active matrix type of twisted nematic liquid crystal display conventionally utilized is briefly described with reference to the drawings.

FIG. 1 is a plan view of the matrix type of twisted nematic liquid crystal display conventionally utilized.

As shown in FIG. 1, the matrix type of twisted nematic liquid crystal display 10 is provided with an array substrate 11 formed of transparent glass material, a large number of gate lines 12 arranged in parallel with each other on the array substrate 11, and a large number of source lines 13 arranged at right angles to the gate lines 12 on the array substrate 11. Therefore, a large number of picture elements 14 which each are surrounded by both one of the gate lines 12 and one of the source lines 13 are formed on the array substrate 11 in an orderly matrix.

In the above configuration, a pulse signal is transmitted through each of the gate lines 12, and a changeable electric potential is applied to the source lines 13.

FIG. 2 is a plan view of one of the picture elements 14 of the twisted nematic liquid crystal display 10 shown in FIG. 1. FIG. 3 is a sectional view of the picture element 14 shown in FIG. 2, the sectional view being taken generally along the line III—III of FIG. 2.

As shown in FIGS. 2, 3, each of the picture elements 14 is provided with the array substrate 11, a plate type of lower polarizer 15 arranged just under the array substrate 11 for linearly polarizing an incident white light with which the picture element 14 is irradiated, a thin type of amorphous silicon transistor 16 turned on by the pulse signal transmitted from the gate line 12, a picture element electrode 17 (or a pixel electrode 17) arranged on the array substrate 11 for receiving the changeable electric potential transmitted from the source line 13 through the amorphous silicon transistor 16 turned on by the pulse signal, and a passivation film 18 arranged between the source line 13 and the picture element electrode 17 for insulating the picture element electrode 17 from the source line 13.

The picture element electrode 17 is formed of an indiumtin oxide thin film so that the electrode 17 is transparent.

Also, the passivation film 18 is transparent.

In the above configuration, when a pulse signal is transmitted to the gate line 12, the amorphous silicon transistor 16 is turned on by the pulse signal as shown in FIG. 4 so that the changeable electric potential applied in the source line 13 is applied to the picture element electrode 17 through the amorphous silicon transistor 16 turned on. Thereafter, even though the amorphous silicon transistor 16 is turned off, the picture element electrode 17 is maintained to the changeable electric potential because the picture element electrode 17 is insulated by the passivation film 18. Also, the lower polarizer 15 is irradiated with the incident white light functioning as a back light. In this case, the incident white light is linearly polarized in a first polarizing direction PD1.

Also, each of the picture elements 14 is further provided with a lower alignment layer 19 arranged on the passivation film 18 in which polymers are oriented in a first rubbing direction RD1, an upper alignment layer 20 arranged over the lower alignment layer 19 through a spacer formed of glass beads in which polymers are oriented in a second rubbing direction RD2 normal to the first rubbing direction RD1, and a liquid crystal layer 21 arranged between the lower and upper alignment layer 19, 20.

A distance between the lower and upper alignment layers 19, 20 ranges from 2 μm to 10 μm.

The lower and upper alignment layers 19, 20 are transparent.

In the above configuration, liquid crystal filled in the liquid crystal layer 21 is crystallized in a nematic type of orientation. Also, the liquid crystal is a dielectric substance having an anisotropic dielectric constant, and the anisotropic dielectric constant is positive. In addition, a surface of the lower alignment layer 19 facing to the upper alignment layer 20 is rubbed to orient the polymers of the film 19 in the first rubbing direction RD1, and a surface of the upper alignment layer 20 facing to the lower alignment layer 19 is rubbed to orient the polymers of the film 20 in the second rubbing direction RD2. That is, when the alignment layers 19, 20 are rubbed in the rubbing directions RD1, RD2, a large number of small grooves are produced so that the polymers are extended towards the rubbing directions.

The rubbing directions RD1, RD2 of the alignment layers 19, 20 are set at 45 degrees to the gate and source lines 12, 13 as shown in FIG. 2 according to a conventional rubbing process. The reason that the rubbing directions RD1, RD2 are set at 45 degrees to the gate and source lines 12, 13 is to uniformly adjust the contrast of the image displayed on the entire picture element 14.

Therefore, when the liquid crystal is filled in a region between the lower and upper alignment layers 19, 20 after the lower and upper alignment layers 19, 20 are attached to each other through the spacer, major axes of liquid crystal molecules in the liquid crystal directly attached on the alignment layer 19 are oriented in the rubbing direction RD1 of the film 19 because the liquid crystal molecules oriented in the rubbing direction RD1 is energetically stable on the alignment layer 19. Also, major axes of liquid crystal molecules directly attached on the alignment layer 20 are oriented in the rubbing direction RD2 of the film 20 because the liquid crystal molecules oriented in the rubbing direction RD2 is energetically stable on the alignment layer 20.

Accordingly, the major axes of the liquid crystal molecules are gradually twisted like a spiral staircase along the optical path of the incident white light oriented from the lower alignment layer 19 to the upper alignment layer 20. As a result, the liquid crystal molecules are twisted 90 degrees in the liquid crystal layer 21. Therefore, in cases where any electric potential is not applied to the picture element electrode 17, the incident white light is circularly polarized 90 degrees in the liquid crystal layer 21 after the liquid crystal layer 21 is irradiated with the incident white light linearly polarized by the lower polarizer 15.

The major axes of the liquid crystal molecules are uniformly twisted either in a clockwise direction or in a counterclockwise direction in the entire liquid crystal layer 21 of the twisted nematic liquid crystal display 10.

In addition, the major axes of liquid crystal molecules are tilted in an upper direction at a pretilt angle $\theta$ having a tilt value. As shown in FIG. 5, the pretilt angle $\theta$ of a liquid crystal molecule is generally defined as an angle between the surface of the alignment layer 19 or 20 and a major axis of the liquid crystal molecule. The arrangement of the liquid crystal molecules at the pretilt angle $\theta$ is generally generated by a repulsive dipole-dipole interaction between a dipole of the polymer and another dipole of the liquid crystal molecule. Also, there are two types of twist conditions. One condition is called a normal twist condition, and another condition is called a reverse twist condition. The tilt value of the pretilt angle generally ranges from about 1 degree to 5 degrees in the normal twist condition.

Also, each of the picture elements 14 is further provided with a common electrode 22 for generating an electric field between the picture element electrode 17 charged to the changeable electric potential and the common electrode 22, a colored filter 23 arranged on the common electrode 22 for coloring the incident white light passing through the liquid crystal layer 21 red, green or blue (RGB), an opposite substrate 24 formed of transparent glass material for mounting the common electrode 22 and the colored filter 23, and a plate type of upper polarizer 25 for linearly polarizing colored light produced in the colored filter 23 in a second polarizing direction PD2 normal to the first polarizing direction PD1 of the lower polarizer 15.

The common electrode 22 is formed of an indium-tin oxide thin film so that the electrode 22 is transparent.

In the above configuration, in cases where any electric potential is not applied to the picture element electrode 17, no electric field is generated between the element picture electrode 17 and the common electrode 22. Therefore, the major axes of the liquid crystal molecules remain twisted 90 degrees in the liquid crystal layer 21. In this case, the incident white light is circularly polarized 90 degrees in the liquid crystal layer 21 after the incident white light is linearly polarized in the first polarizing direction PD1 by the lower polarizer 15. Therefore, the incident white light passing through the liquid crystal layer 21 is linearly polarized in the same direction as the second polarizing direction PD2 of the output polarizer 25 normal to the first polarizing direction PD1. Thereafter, the incident white light is colored red, green or blue in the colored filter 23 to produce a piece of colored light, and the colored light produced is linearly polarized in the second polarizing direction PD2. In this case, because the colored light has been linearly polarized in the same direction as the second polarizing direction PD2 in the liquid crystal layer 21, quantity of the colored light is not varied in the upper polarizer 25.

Accordingly, the colored light is radiated from each of the picture elements 14.

In cases where the picture element 14 having the red-colored filter 23, the picture element 14 having the green-colored filter 23, and the picture element 14 having the blue-colored filter 23 are arranged in a set, a viewer can feel colored lights provided from the above three picture elements 14 as a white light.

In contrast, in cases where a changeable electric potential is applied to the picture element electrode 17 from the source line 13, a vertical electric field is generated between the element picture electrode 17 and the commonelectrode 22. In this case, the major axes of the liquid crystal molecules twisted 90 degrees in the liquid crystal layer 21 are forcibly oriented in the same direction as the vertical electric field on condition that the intensity of the vertical electric field is high enough to forcibly orient the major axes of the liquid crystal molecules in a vertical direction parallel to the vertical electric field. Therefore, the incident white light is not circularly polarized at all in the liquid crystal layer 21 after the incident white light is linearly polarized in the first polarizing direction PD1 by the lower polarizer 15. Thereafter, the incident white light not circularly polarized is colored red, green or blue in the colored filter 23 to produce a colored light, and the colored light is transmitted to the second polarizing direction PD2. In this case, because the colored light is linearly polarized in the first polarizing direction PD1, the incident white light can not pass through the upper polarizer 25 because the colored light is linearly polarized in the second polarizing direction PD2 normal to the first polarizing direction PD1 by the upper polarizer 25. Therefore, the incident white light radiated to the picture element 14 can not transmit through the picture element 14.

Accordingly, in cases where the picture element 14 having the red-colored filter 23, the picture element 14 having the green-colored filter 23, and the picture element 14 having the blue-colored filter 23 are arranged in a set, one of three light source colored lights can be obtained by applying the changeable electric potential to two of the three picture elements 14 arranged in a set.

Also, in cases where the changeable electric potential applied to the source line 13 is controlled, major axis directions of the liquid crystal molecules of which major axes are twisted 90 degrees can be changed by a suitable angle. Therefore, the incident white light can be circularly polarized in the liquid crystal layer 21, dependent on the intensity of the changeable electric potential. As a result, the quantity of the colored light transmitted from the picture element can be controlled.

Accordingly, any type of colored light can be obtained by combining a piece of red light, a piece of green light, and a piece of blue light radiated from the set of three picture elements 14. Therefore, a colored image can be displayed on the matrix type of twisted nematic liquid crystal display 10.

2.2 Problems to be Solved by the Invention

However, the gate line 12 and the source line 13 is arranged adjacent to the picture element electrode 17 because a large number of picture elements 14 must be arranged in close formation to display a fine image. For example, the distance between the gate or source line 12, 13 and the picture element electrode 17 is within several micro meters ($\mu$m).

Also, the electric potential applied to the source line 13 is always changed to control the polarization direction of the incident white light circularly polarized in the liquid crystal layer 21 by changing major axis directions of the liquid crystal molecules. Therefore, when the transistor 16 is turned off, an electric potential difference between the picture element electrode 17 and the source line 13 is necessarily generated, dependent on the change of the electric potential applied to the source line 13. As a result, not only the vertical electric field is induced between the picture element electrode 17 and the common electrode 22, but also a first lateral electric field is induced between the picture element electrode 17 and the source line 13.

In addition, the electric potential of the gate line 12 is always changed because a pulse signal is intermittently transmitted in the gate line 12. Therefore, another electric potential difference between the picture element electrode 17 and the gate line 12 is necessarily generated. As a result, a second lateral electric field is induced between the picture element electrode 17 and the gate line 12. The first and second lateral electric fields are called a lateral electric field for convenience in this specification hereinafter.

Because the lateral electric field is inevitably generated in each of the picture elements 14 in the twisted nematic liquid crystal display 10, even though the alignment layers 19, 20 are rubbed in the rubbing directions RD1, RD2 normal to each other, the liquid crystal molecules in the liquid crystal layer 21 are irregularly oriented. In other words, the normal tilt condition of the liquid crystal molecules is changed to the reverse tilt condition to stably arrange the liquid crystal molecules. Therefore, even though no vertical electric field is induced between the picture element electrode 17 and the common electrode 22, the major axes of the liquid crystal molecules in the liquid crystal 21 are not accurately twisted 90 degrees so that the contrast of the image displayed on the twisted nematic liquid crystal display 10 deteriorates.

Also, because the rubbing direction RD1 of the alignment layer 19 is generally set at 45 degrees to the gate and source lines 12, 13 and because the major axes of the liquid crystal molecules are twisted from the rubbing direction RD1 to the rubbing direction RD2, adverse influence of the lateral electric field such as a dipole-dipole interaction is easily affected on the liquid crystal molecules.

Also, because the tilt value of the pretilt angle is small, a dipole moment adversely influenced on each of the liquid crystal molecules by the lateral electric field is comparatively large.

Also, because the major axes of the liquid crystal molecules are uniformly twisted either in a clockwise direction or in a counterclockwise direction, the elastic deformation of the liquid crystal molecules is not enough to change the liquid crystal molecules irregularly oriented in the liquid crystal layer 21 to the liquid crystal molecules regularly oriented.

As a result, the liquid crystal molecules are irregularly oriented in the liquid crystal layer 21 adjacent to the picture element electrode 17 by the lateral electric field.

In addition, as a result of the liquid crystal molecules irregularly oriented in the liquid crystal layer 21, a reverse tilt disclination line is generated in the liquid crystal layer 21 adjacent to the picture element electrode 17. In cases where the reverse tilt disclination line is generated, even though any electric potential is not applied to the picture element electrode 17 by the source line 17, the incident white light polarized by the lower polarizer 15 can not be circularly polarized by liquid crystal molecules arranged adjacent to the reverse tilt disclination line so that any colored light can not be radiated from the picture element 14. Also, even though an electric potential is applied to the picture element electrode 17 by the source line 17, the incident white light polarized by the lower polarizer 15 is circularly polarized to some extent by liquid crystal molecules arranged adjacent to the reverse tilt disclination line so that a piece of colored light is radiated from the picture element 14. Therefore, the contrast of the image deteriorates.

The mechanism that the reverse tilt disclination line is generated by the lateral electric field induced between the picture element electrode 17 and the gate line 12 or between the picture element electrode 17 and the source line 13 is described with reference to FIG. 6.

FIGS. 6A, 6B explanatorily show the diffusion of the liquid crystal molecules set to the reverse tilt condition.

In cases where the intensity of the lateral electric field is low, liquid crystal molecules arranged adjacent to the picture element electrode 17 are regularly oriented. In other words, the liquid crystal molecules directly arranged on the lower alignment film 19 are set in the normal tilt condition as shown in FIG. 5. Therefore, the liquid crystal molecules in the liquid crystal layer 21 are set in a normal twist condition.

In contrast, in cases where the intensity of the lateral electric field is high, liquid crystal molecules arranged adjacent to edges of the picture element electrode 17 are irregularly oriented because the lateral electric field is concentrated at the edges of the picture element electrode 17. In other words, the liquid crystal molecules are set in the reverse tilt condition as shown in FIG. 5. Therefore, other liquid crystal molecules arranged on the liquid crystal molecules which are arranged adjacent to the edges of the picture element electrode 17 are set in a reverse twist condition.

Therefore, as shown in FIG. 6A, when the intensity of the lateral electric field becomes high, liquid crystal molecules arranged adjacent to edges of the picture element electrode 17 are strongly set in the reverse tilt condition. In contrast, liquid crystal molecules arranged on the picture element electrode 17 remain set in the normal tilt condition.

Thereafter, as shown in FIG. 6B, the liquid crystal molecules strongly set in the reverse tilt condition is changed to the liquid crystal molecules weakly set in the reverse tilt condition while the liquid crystal molecules set in the normal tilt condition on the picture element electrode 17 is changed to the liquid crystal molecules weakly set in the reverse tilt condition. Therefore, the reverse tilt condition is diffused to the liquid crystal molecules arranged on the picture element electrode 17.

Thereafter, when a vertical electric field is induced between the picture element electrode 17 and the common electrode 24, major axes of the liquid crystal molecules weakly set in the reverse tilt condition are vertically oriented along the vertical electric field on the picture element electrode 17 while the liquid crystal molecules remain set in the reverse tilt condition. In contrast, major axes of other liquid crystal molecules set in the normal tilt condition are vertically oriented along the vertical electric field on the picture element electrode 17 while the liquid crystal molecules remain set in the normal tilt condition.

As a result, the reverse tilt disclination line is generated in a boundary line between the liquid crystal molecules set to the reverse tilt condition and the liquid crystal molecules set to the normal tilt condition.

Accordingly, the incident white light passing through the liquid crystal molecules arranged adjacent to the reverse tilt disclination line is irregularly poralized regardless of whether an electric potential is applied to the picture element electrode 17. Therefore, the contrast of the image displayed on the twisted nematic liquid crystal display 10 deteriorates.

In addition, a shielding film is generally equipped in a display domain of the picture element 14 to shield the incident white light passing through the liquid crystal molecules arranged adjacent to the reverse tilt disclination line. In this case, the incident white light passing through the liquid crystal molecules arranged adjacent to the reverse tilt disclination line can not transmit through the picture element 14 regardless of whether or not an electric potential is applied to the picture element electrode 17. Therefore, the contrast is improved. However, the ratio of an opening area which is not shielded by the shielding film to the entire area of the picture element 14 deteriorates so that the image can not be displayed in a high brightness.

SUMMARY OF THE INVENTION

An object of the present invention is to provide, with due consideration to the drawbacks of such a conventional, an active matrix type of twisted nematic liquid crystal in which a colored light is radiated from each of picture elements as required and an image is displayed in a superior contrast and in a high brightness.

The above object is achieved by the provision of an active matrix type of twisted nematic liquid crystal display, comprising:
an array substrate;
an opposite substrate arranged over the array substrate;
a gate line arranged on the array substrate for transmitting a pulse signal;
a source line arranged on the array substrate for transmitting electric charges;
a switching device which is turned on by the pulse signal transmitted from the gate line;
a pixel electrode for holding the electric charges transmitted from the source line through the switching device in cases where the switching device is turned on;
a first alignment layer arranged on the array substrate to cover the pixel electrode, the first alignment layer being rubbed in a first direction and a second direction opposite to the first direction;
a common electrode arranged on the opposite substrate for inducing an electric field between the common electrode and the pixel electrode in cases where the electric charges are held in the pixel electrode;
a second alignment layer arranged on the common electrode to face the first alignment layer, the second alignment layer being rubbed in a third direction and a fourth direction opposite to the third direction; and
a liquid crystal layer arranged between the first and second alignment layers facing each other,
(1) liquid crystal molecules set in a nematic liquid crystal phase being filled up in the liquid crystal layer,
(2) major axes of the liquid crystal molecules arranged on the first alignment layer being tilted at a pretilt angle in the first or second direction,
(3) major axes of the liquid crystal molecules arranged on the second alignment layer being tilted at the pretilt angle in the third or fourth direction,
(4) the liquid crystal molecules which are arranged between the second alignment layer and the first alignment layer positioned above the pixel electrode being set to a normal twist condition in which the major axes of the liquid crystal molecules arranged on the first alignment layer are tilted at a pretilt angle in the first direction and the major axes of the liquid crystal molecules arranged on the second alignment layer are tilted at the pretilt angle in the third direction, and
(5) the liquid crystal molecules which are arranged between the second alignment layer and the first alignment layer positioned outside the pixel electrode being set to a reverse twist condition in which the major axes of the liquid crystal molecules arranged on the first alignment layer are tilted at the pretilt angle in the second direction and the major axes of the liquid crystal molecules arranged on the second alignment layer are tilted at the pretilt angle in the third direction.

In the above configuration, the major axes of the liquid crystal molecules filled in the liquid crystal layer are gradually twisted along a vertical direction directed from the first alignment layer to the second alignment layer because the major axes of the liquid crystal molecules arranged on the first alignment layer are tilted in the first or second direction and because the major axes of the liquid crystal molecules arranged on the second alignment layer are tilted in the third or fourth direction. Therefore, in cases where the liquid crystal layer is irradiated with a piece of white light from the first alignment layer, the white light is circularly polarized.

In cases where a pulse signal is transmitted on the gate line, the switching device is turned on. Therefore, electric charges are transmitted to the pixel electrode so that the pixel electrode is charged to an electric potential. As a result, an electric field is induced between the pixel electrode and the common electrode. In this case, because each of the liquid crystal molecules is a dielectric substance having an anisotropic dielectric constant, the major axes of the liquid crystal molecules are forcibly arrayed in the vertical direction directed from the first alignment layer to the second alignment layer. Therefore, the twist of the major axes of the liquid crystal molecules is disappeared.

Therefore, in cases where the liquid crystal layer is irradiated with a piece of white light from the first alignment layer on condition that the electric field is induced between the pixel electrode and the common electrode, the white light is not circularly polarized.

Also, in cases where the intensity of the electric potential applied to the pixel electrode is controlled, the intensity of the electric field is also controlled. In this case, a twisted degree of the major axes of the liquid crystal molecules is suitably controlled.

Therefore, in cases where the liquid crystal layer is irradiated with a piece of white light from the first alignment layer on condition that the intensity of the electric field is controlled, the white light can be suitably polarized.

Accordingly, a picture image can be display on the active matrix type of twisted nematic liquid crystal.

In addition, a group of liquid crystal molecules arranged over the pixel electrode is set to the normal twist condition. In contrast,-a remaining group of liquid crystal molecules not arranged over the pixel electrode is set to the reverse twist condition because the first alignment layer are rubbed in the first and second directions opposite to each other and because the second alignment layer are rubbed in the third and fourth directions opposite to each other.

Therefore, a potential barrier to the elastic deformation of the liquid crystal molecules is formed in a boundary between the group of liquid crystal molecules set in the normal twist condition and the remaining group of liquid crystal molecules set in the reverse twist condition.

Also, a lateral electric field is induced between the pixel electrode and the gate or source line in cases where the electric potential of the gate or source line is changed. Especially, the lateral electric field is concentrated at the edges of the pixel electrode facing to the gate or source line. Therefore, the lateral electric field forces the liquid crystal molecules arranged adjacent to the edges of the pixel electrode to be elastically deformed. In other words, the normal twist condition of the liquid crystal molecules are forced to be changed to the reverse tilt condition because the liquid crystal molecules set in the reverse twist condition is stable, depending on a distribution of the lateral electric field.

However, because the potential barrier is formed in the boundary, the potential barrier prevents the liquid crystal molecules arranged adjacent to the edges of the pixel electrode from being set in the reverse twist condition. Therefore, the group of liquid crystal molecules which are arranged over the pixel electrode and are set in the normal twist condition is not changed to the reverse twist condition.

Accordingly, even though the lateral electric field is induced, the reverse twist condition is not diffused to the liquid crystal molecules arranged over the pixel electrode. Therefore, a domain in which the liquid crystal molecules set in the reverse twist condition are arranged can be limited in a small volume. As a result, a picture image can be display by the light passing through the pixel electrode in a high brightness on the active matrix type of twisted nematic liquid crystal according to the present invention.

It is preferred that a black matrix by which a piece of light passing through the liquid crystal layer is shielded be mounted on the opposite substrate positioned just above the liquid crystal molecules which are set in the reverse twist condition.

In the above configuration, a piece of light passing through the liquid crystal layer set in the reverse twist condition is shielded. In other words, only other pieces of light passing through the liquid crystal layer set in the nomal twist condition can be radiated from the active matrix type of twisted nematic liquid crystal according to the present invention.

Accordingly, a picture image can be display in a high contrast.

Also, it is preferred that a first polarizer be mounted on the array substrate to linearly polarize a piece of light in the first and second directions before the light passes through the liquid crystal layer, and a second polarizer be mounted on the opposite substrate to linearly polarize the light in the third and fourth directions after the light passes through the liquid crystal layer.

In the above configuration, a piece of light polarized by the first polarizer in the first and second directions is substantially linearly polarized in the liquid crystal layer in the third and second directions in cases where the pixel electrode is fully charged. Therefore, the light can transmit through the second polarizer.

In contrast, a piece of light polarized by the first polarizer in the first and second directions is not polarized in the liquid crystal layer in cases where the pixel electrode is not charged. Therefore, the light can not transmit through the second polarizer.

Also, a piece of light polarized by the first polarizer in the first and second directions is linearly polarized in the liquid crystal layer in a direction defined between the first and third directions in cases where the pixel electrode is not fully charged. Therefore, the intensity of the light transmitting through the second polarizer is reduced as compared with that of the light polarized by the first polarizer .

Accordingly, the intensity of the light transmitting through the active matrix type of twisted nematic liquid crystal according to the present invention can be controlled.

Also, it is preferred that a colored filter be mounted on the opposite substrate to change a piece of white light transmitting through the liquid crystal layer to a piece of colored light.

In the above configuration, even though a piece of white light is circularly polarized in the liquid crystal layer, the white light is colored by the colored filter. Therefore, in cases where, a piece of colored light passing through a red-colored filter, a piece of colored light passing through a green-colored filter, and a piece of colored light passing through a blue-colored filter closely pass through the active matrix type of twisted nematic liquid crystal, a viewer can feel a suitable natural color.

Accordingly, a colored picture image can be displayed on the twisted nematic liquid crystal.

Also, it is preferred that the liquid crystal molecules set in the reverse twist condition be arranged along the source line.

In the above configuration, even though the electric potential of the source line is changed to induce the lateral electric field between the source line and the pixel electrode, the potential barrier to the elastic deformation of the liquid crystal molecules can be properly formed between the source line and the pixel electrode to prevent the reverse twist condition from diffusing to a domain positioned over the pixel electrode.

Accordingly, the diffusion of the reverse twist condition can be properly suppressed.

Also, it is preferred that the liquid crystal molecules set in the reverse twist condition be arranged along the gate line.

In the above configuration, even though the electric potential of the gate line is changed to induce the lateral electric field between the gate line and the pixel electrode, the potential barrier to the elastic deformation of the liquid crystal molecules can be properly formed between the gate line and the pixel electrode to prevent the reverse twist condition from diffusing to a domain positioned over the pixel electrode.

Accordingly, the diffusion of the reverse twist condition can be properly suppressed.

Also, the above object is achieved by the provision of an active matrix type of twisted nematic liquid crystal display, comprising:
  an array substrate;
  an opposite substrate arranged over the array substrate;
  a gate line arranged on the array substrate for transmitting a pulse signal;
  a source line arranged on the array substrate for transmitting electric charges;
  a switching device which is turned on by the pulse signal transmitted from the gate line;
  a pixel electrode for holding the electric charges transmitted from the source line through the switching device in cases where the switching device is turned on;
  a first alignment layer arranged on the pixel electrode, the first alignment layer being rubbed in a first direction to tilt major axes of liquid crystal molecules arranged on the first alignment layer at a first pretilt angle in the first direction;
  a second alignment layer arranged on the array substrate to surround the first alignment layer, major axes of liquid crystal molecules arranged on the second alignment layer being tilted at a second pretilt angle of almost 90 degrees;
  a common electrode arranged on the opposite substrate for inducing an electric field between the common electrode and the pixel electrode in cases where the electric charges are held in the pixel electrode;
  a third alignment layer arranged on the common electrode to face the first and second alignment layers, the third alignment layer being rubbed in a second direction to tilt major axes of liquid crystal molecules arranged on the third alignment layer at the first pretilt angle in the second direction; and
  a liquid crystal layer arranged between the first and third alignment layers facing each other and between the second and third alignment layers facing each other,
  (1) liquid crystal molecules set in a nematic liquid crystal phase being filled up in the liquid crystal layer, and
  (2) the liquid crystal molecules arranged on the second alignment layer adjacent to edges of the pixel electrode being tilted at a second pretilt angle higher than the first pretilt angle in the first direction.

In the above configuration, a lateral electric field is induced between the pixel electrode and the source line or between the pixel electrode and the gate line because an electric potential applied to the gate line or source line is changed. In this case, because the lateral electric field is concentrated at edges of the pixel electrode, the lateral electric field forces the liquid crystal molecules arranged adjacent to the edges of the pixel electrode to be elastically deformed. In other words, the liquid crystal molecules which are arranged adjacent to the edges of the pixel electrode and are set in a normal tilt condition are forced to change to the liquid crystal molecules set in a reverse tilt condition.

However, because the liquid crystal molecules arranged adjacent to the edges of the pixel electrode are tilted at the second pretilt angle higher than the first pretilt angle, the normal tilt condition of the liquid crystal molecules is maintained even though the lateral electric field is induced.

Therefore, the liquid crystal molecules arranged on the pixel electrode are also maintained to the normal tilt condition so that a surface of the pixel electrode can be widen.

Accordingly, a picture image can be displayed on the active matrix type of twisted nematic liquid crystal in a high brightness and in a high contrast.

It is preferred that the second alignment layer be arranged on the array substrate between the pixel electrode and the source line.

In the above configuration, liquid crystal molecules arranged on the first alignment layer adjacent to the edges of the pixel electrode facing to the source line are necessarily adjacent to the second alignment layer because the second alignment layer is arranged on the array substrate between the pixel electrode and the source line. Therefore, major axes of the liquid crystal molecules are tilted at the second pretilt angle.

Accordingly, even though the lateral electric field is induced between the source line and the pixel electrode, the liquid crystal molecules are not adversely influenced by the lateral electric field.

Also, it is preferred that the second alignment layer be arranged on the array substrate between the pixel electrode and the gate line.

In the above configuration, liquid crystal molecules arranged on the first alignment layer adjacent to the edges of the pixel electrode facing to the gate line are necessarily adjacent to the second alignment layer because the second alignment layer is arranged on the array substrate between the pixel electrode and the gate line. Therefore, major axes of the liquid crystal molecules are tilted at the second pretilt angle.

Accordingly, even though the lateral electric field is induced between the gate line and the pixel electrode, the liquid crystal molecules are not adversely influenced by the lateral electric field.

Also, the above object is achieved by the provision of an active matrix type of twisted nematic liquid crystal display, comprising:
  an array substrate;
  an opposite substrate arranged over the array substrate;
  a gate line arranged on the array substrate for transmitting a pulse signal;
  a source line arranged on the array substrate for transmitting electric charges;
  a switching device which is turned on by the pulse signal transmitted from the gate line;
  a pixel electrode for holding the electric charges transmitted from the source line through the switching device in cases where the switching device is turned on;
  a lower alignment layer arranged on the array substrate to cover the pixel electrode, the lower alignment layer being rubbed in a first direction to tilt major axes of liquid crystal molecules arranged on the lower alignment layer at a pretilt angle in the first direction;

a common electrode arranged on the opposite substrate for inducing an electric field between the common electrode and the pixel electrode in cases where the electric charges are held in the pixel electrode;

an upper alignment layer arranged on the common electrode to face the lower alignment layer, (1) the upper alignment layer being rubbed in a second direction to tilt major axes of liquid crystal molecules arranged on the upper alignment layer at the pretilt angle in the second direction, and (2) a third direction between the first and second directions being parallel to the source line;

a liquid crystal layer arranged between the lower and upper alignment layers facing each other, (1) liquid crystal molecules set in a nematic liquid crystal phase being filled up in the liquid crystal layer, (2) major axes of the liquid crystal molecules being gradually twisted from the first direction to the second direction along a vertical direction directed from the lower alignment layer to the upper alignment layer, and (3) the major axes of the liquid crystal molecules arranged in a reference position lower than a middle position between the lower alignment layer and the upper alignment layer being oriented in the third direction parallel to the source line.

In the above configuration, a lateral electric field is induced between the pixel electrode and the source line because an electric potential applied to the source line is changed. However, the liquid crystal molecules are not adversely influenced by the lateral electric field because the major axes of the liquid crystal molecules arranged in the reference position are oriented in the third direction parallel to the source line.

The reason that the liquid crystal molecules are not adversely influenced by the lateral electric field is described in detail.

Liquid crystal molecules in the liquid crystal layer are dielectric substances having an anisotropic dielectric constant in major axis directions thereof. Therefore, in cases where a liquid crystal molecule is set in a lateral electric field induced between the source line and the pixel electrode, an attractive-repulsive force exerted on the liquid crystal molecule depends on an angle between a major axis direction of the liquid crystal molecule and a direction of the lateral electric field. That is, the intensity of the attractive-repulsive force is proportional to a product of a lateral electric field intensity and an orthogonal projection length on the lateral electric field of the major axis of the liquid crystal molecule. In other words, the intensity of the attractive-repulsive force is proportional to a scalar product of the lateral electric field and the major axis of the liquid crystal molecule. For example, in cases where a major axis direction of the liquid crystal molecule is at right angles to a direction of the lateral electric field, no force is exerted on the liquid crystal molecule by the lateral electric field. In contrast, in cases where a major axis direction of the liquid crystal molecule is parallel to a direction of the lateral electric field, an attractive-repulsive force exerted on the liquid crystal molecule is maximum.

Therefore, in cases where a scalar product sum obtained by integrating the scalar product in the entire liquid crystal layer is minimum, the adverse influence of the lateral electric field on the liquid crystal molecules in the liquid crystal layer can be minimized.

The scalar product sum is expressed by a following equation.

$$F = \int_V E(v) \cdot \cos\theta(v) \, dV$$

Wherein a symbol F denotes the scalar product sum, a symbol $E(v)$ denotes the intensity of the lateral electric field in an integrated region V, a symbol $\theta(v)$ denotes a crossing angle between a major axis direction of the liquid crystal molecule and a direction of the lateral electric field, and a symbol $dV$ denotes a volumetric integration.

The scalar product sum F mainly depends on the crossing angle $\theta(v)$ in an integrated region $Vo$ in which the intensity of the lateral electric field $E(vo)$ is considerably high as compared with those in other integrated regions.

Also, an intensity distribution of the electric field in the liquid crystal layer is determined by both an electric potential difference between the pixel electrode and the source line and a three-dimensional structure of the pixel electrode and the source line.

The integrated region $Vo$ is generally positioned in a lower region of the liquid crystal layer.

Therefore, major axis directions of the liquid crystal molecules arranged in the reference position are set to the same direction as the source line.

Accordingly, even though the lateral electric field is induced between the source line and the pixel electrode, the liquid crystal molecules are not adversely influenced by the lateral electric field.

It is preferred that the first direction be inclined to the source line at inclined angles ranging from 1 degree to 44 degrees in cases where the second direction is at right angles to the first direction.

In the above configuration, major axes of the liquid crystal molecules arranged at the reference position are necessarily oriented in the third direction.

Also, the above object is achieved by the provision of an active matrix type of twisted nematic liquid crystal display, comprising:

an array substrate;

an opposite substrate arranged over the array substrate;

a gate line arranged on the array substrate for transmitting a pulse signal;

a source line arranged on the array substrate for transmitting electric charges;

a switching device which is turned on by the pulse signal transmitted from the gate line;

a pixel electrode for holding the electric charges transmitted from the source line through the switching device in cases where the switching device is turned on;

a lower alignment layer arranged on the array substrate to cover the pixel electrode, the lower alignment layer being rubbed in a first direction to tilt major axes of liquid crystal molecules arranged on the lower alignment layer at a pretilt angle in the first direction;

a common electrode arranged on the opposite substrate for inducing an electric field between the common electrode and the pixel electrode in cases where the electric charges are held in the pixel electrode;

an upper alignment layer arranged on the common electrode to face the lower alignment layer, (1) the upper alignment layer being rubbed in a second direction to tilt major axes of liquid crystal molecules arranged on the upper alignment layer at the pretilt angle in the second direction, and (2) a third direction between the first and second directions being parallel to the gate line;

a liquid crystal layer arranged between the lower and upper alignment layers facing each other, (1) liquid crystal molecules set in a nematic liquid crystal phase being filled up in the liquid crystal layer, (2) major axes of the liquid crystal molecules being gradually twisted from the first direction to the second direction along a vertical direction directed from the lower alignment layer to the upper alignment layer, and (3) the major axes of the liquid crystal molecules arranged in a reference position lower than a middle position between the lower alignment layer and the upper alignment layer being oriented in the third direction parallel to the gate line.

In the above configuration, a lateral electric field is induced between the pixel electrode and the gate line because an electric potential applied to the gate line is changed. However, the liquid crystal molecules are not adversely influenced by the lateral electric field because the major axes of the liquid crystal molecules arranged in the reference position are oriented in the third direction parallel to the gate line.

Accordingly, even though the lateral electric field is induced between the gate line and the pixel electrode, the liquid crystal molecules are not adversely influenced by the lateral electric field.

It is preferred that the first direction be inclined to the gate line at inclined angles ranging from 1 degree to 44 degrees in cases where the second direction is at right angles to the first direction.

In the above configuration, major axes of the liquid crystal molecules arranged at the reference position are necessarily oriented in the third direction.

BRIEF DESCRIPTION OF THE DRAWINGS

The objects, features and advantages of the present invention will be apparent from the following description taken in conjunction with the accompanying drawings, in which.

DETAILED DESCRIPTION OF THE PREFERRED EMBODIMENTS

Preferred embodiments of an active matrix type of twisted nematic liquid crystal are described with reference to drawings.

Figure 1:
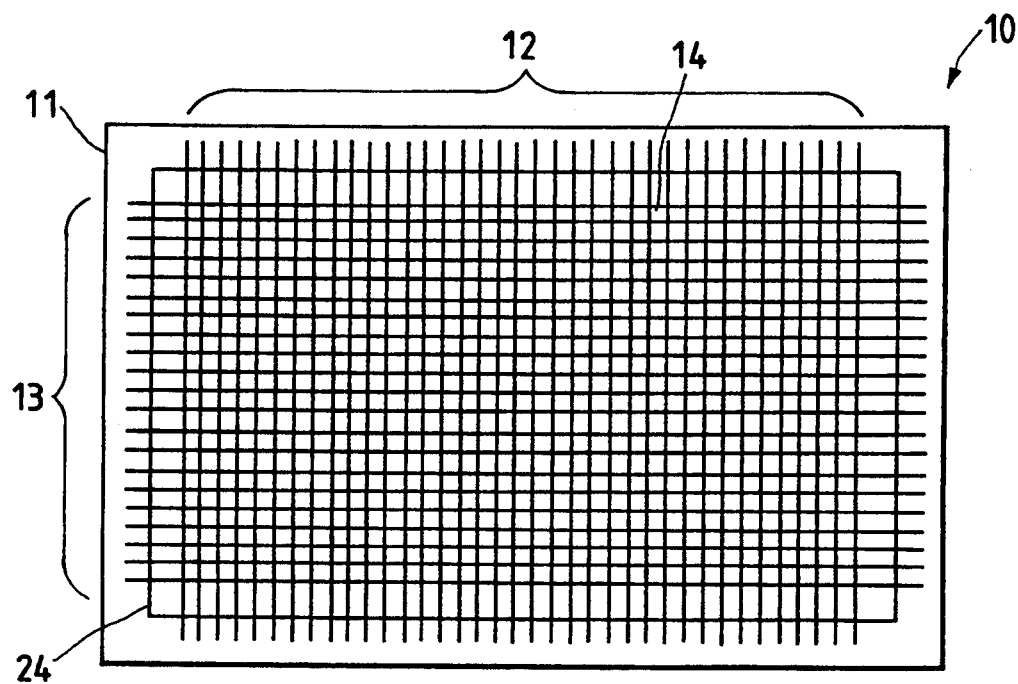
FIG. 1 is a plan view of a matrix type of twisted nematic liquid crystal display conventionally utilized.
Figure 2:
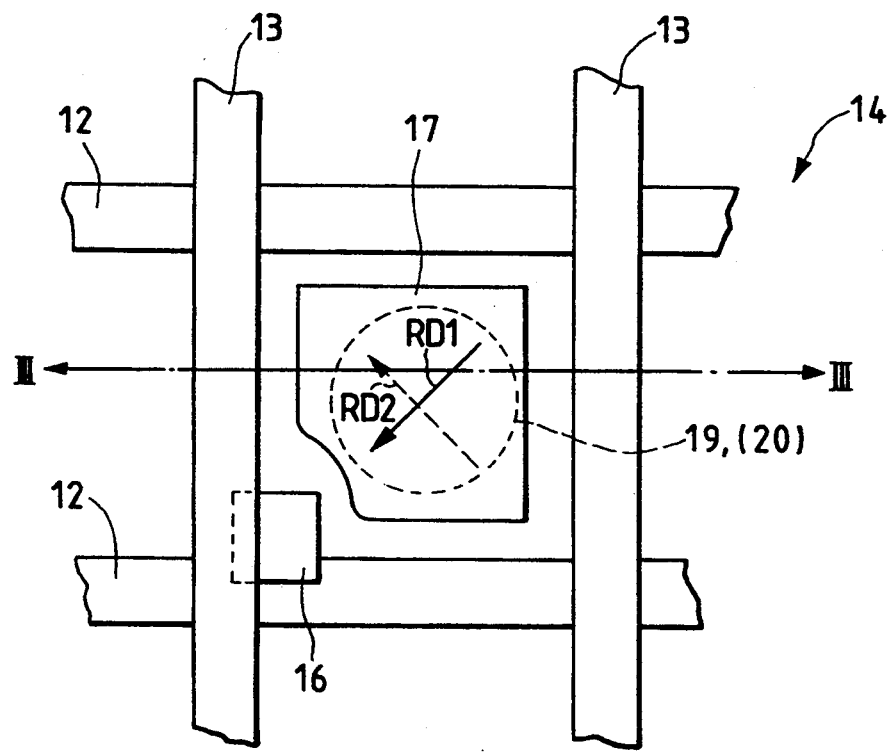
FIG. 2 is a plan view of one of picture elements orderly arranged in the twisted nematic liquid crystal display shown in FIG. 1.
Figure 3:
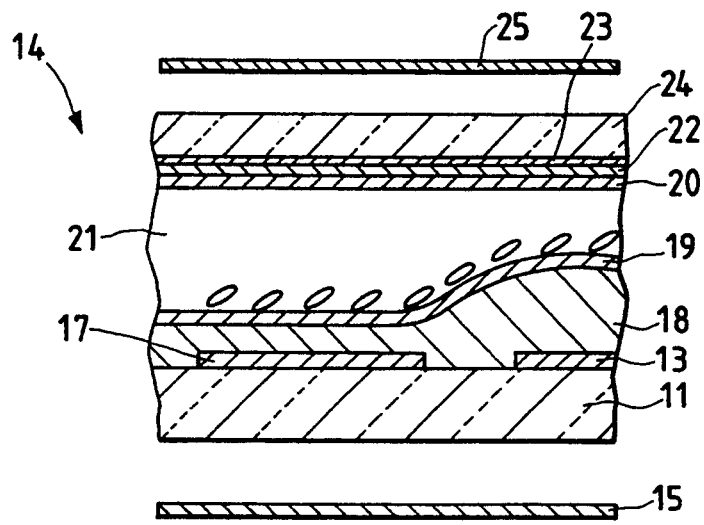
FIG. 3 is a sectional view of the picture element shown in FIG. 2, the sectional view being taken generally along the line III—III of FIG. 2.
Figure 4:
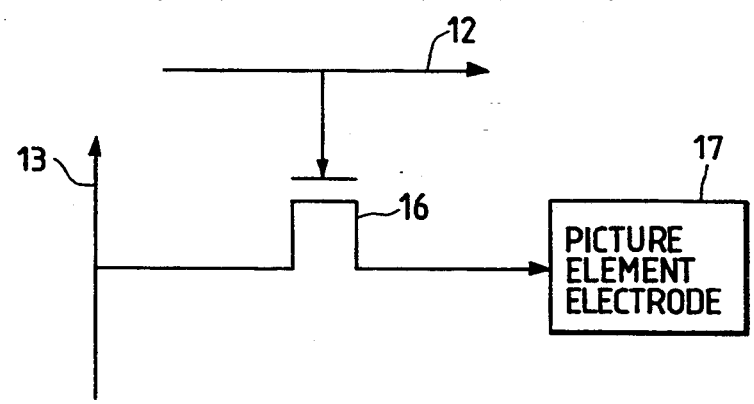
FIG. 4 shows an electric circuit for applying a changeable electric potential to a picture element electrode shown in FIG. 3.

Constructional elements which are the same as those utilized in the conventional nematic liquid crystal display 10 are denoted by the same reference numerals as those shown in FIGS. 1 to 3.

1. First Embodiment

Figure 7:
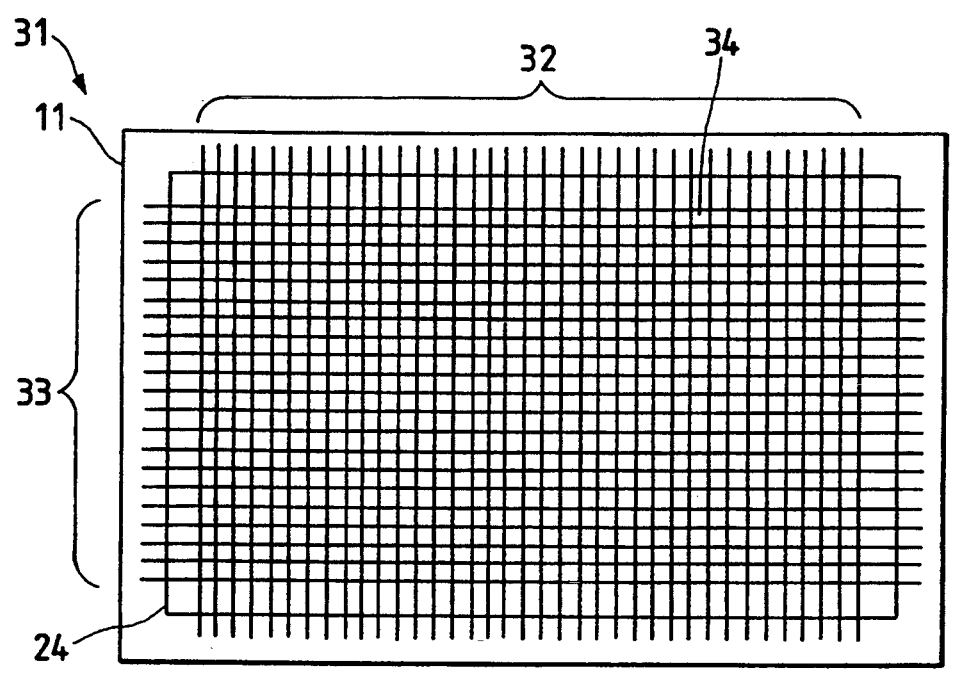
FIG. 7 is a plan view of a matrix type of twisted nematic liquid crystal display according to a first embodiment of the present invention.
Figure 8:
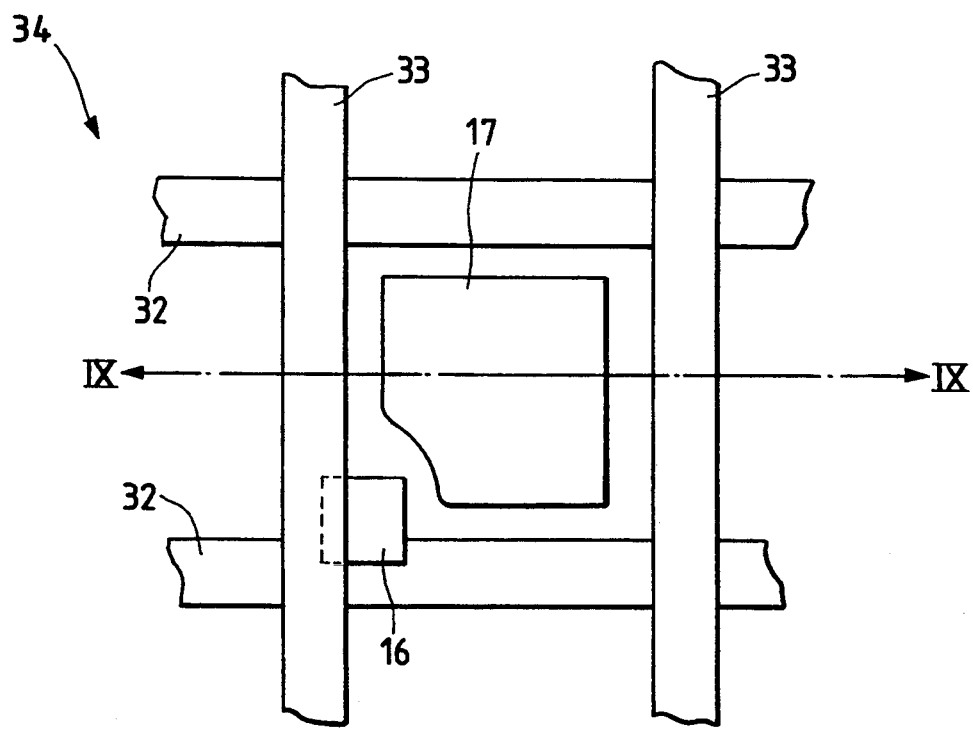
FIG. 8 is a plan view of a picture element arranged in the twisted nematic liquid crystal display shown in FIG. 7.

FIG. 7 is a plan view of a matrix type of twisted nematic liquid crystal display according to a first embodiment of the present invention. FIG. 8 is a plan view of a picture element arranged in the twisted nematic liquid crystal display shown in FIG. 7.

As shown in FIG. 7, a matrix type of twisted nematic liquid crystal display 31 according to a first embodiment, comprises the array substrate 11, a plurality of gate lines 32 arranged in parallel, a plurality of source lines 33 arranged normal to the gate lines 32, and the opposite substrate 24 mounted on the gate and source lined 32, 33.

The number of gate lines 32 is 720, and the number of source lines 33 is 479. Therefore, picture elements 34 which each are surrounded by the gate and source lines 32, 33 are formed on the array substrate 11, and the number of picture elements 34 is 344880. The thickness of the source lines 33 is about 7000 angstroms, and the thickness of the gate lines 32 is about 1000 angstroms. The width of the gate and source lines 32, 33 is 8 $\mu$m. The distance between the gate lines 32 is about 82 $\mu$m, and the distance between the source lines 33 is about 82 $\mu$m. Also, a diagonal length of a display area surrounded by both the outer gate line 32 and the outer source line 33 is 71 mm (2.8 inches).

As shown in FIG. 8, each of picture elements 34 arranged in the twisted nematic liquid crystal display 31 comprises the thin type of amorphous silicon transistor 16 connected with the gate and source lines 32, 33 and the picture element electrode 17 (or the pixel electrode 17).

In the above configuration, each of the transistors 16 is turned on by receiving a pulse signal from one of the gate lines 32, so that an electric potential is applied to the picture element electrode 17 from the source line 33 through the transistor 16.

Figure 9:
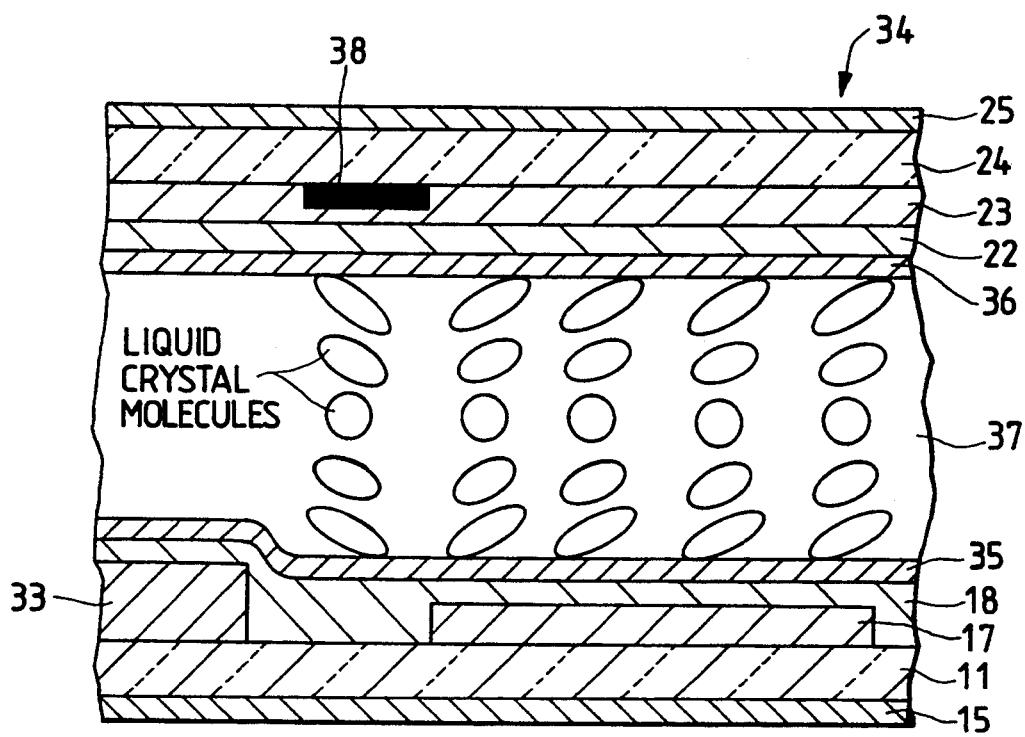
FIG. 9 is a sectional view of the picture element shown in FIG. 8, the sectional view being taken generally along the line IX—IX of FIG. 8.

FIG. 9 is a sectional view of the picture element 34 shown in FIG. 8, the sectional view being taken generally along the line IX—IX of FIG. 8.

As shown in FIG. 9, the picture element 34 further comprises the lower polarizer 15, the array substrate 11, the source line 33, the passivation film 18, a lower alignment layer 35 which is rubbed in two rubbing directions RD3, RD4 opposite to each other, an upper alignment layer 36 which is rubbed in two rubbing directions RD5, RD6 opposite to each other, a liquid crystal layer 37 in which mixed liquid crystal is filled up between the lower and upper alignment layers 35, 36, the common electrode 22, the colored filter 23, a black matrix 38 arranged in a portion of the colored filter 23 for shielding a piece of incident white light passing through the liquid crystal layer 37, the opposite substrate 24, and the upper polarizer 25.

The black matrix 38 is made of a plate type of chromium of which the thickness is 1000 angstroms, and the black matrix 38 is arranged just above the liquid crystal layer 37 positioned between the picture element electrode 17 and the source line 33.

Figure 10:
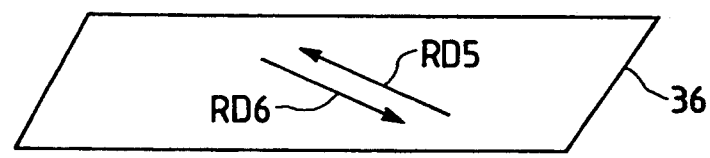
FIG. 10 is a diagonal view of lower and upper alignment layers mounted on array and opposite substrates shown in FIG. 9, showing rubbing directions RD3 to RD6 of the lower and upper alignment layers.
Figure 10:
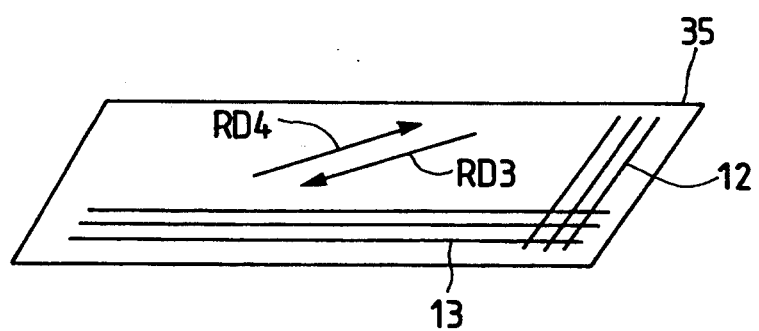

The lower and upper alignment layers 35, 36 are respectively made of polyimide, and the rubbing directions RD5, RD6 of the upper alignment layer 36 are normal to the rubbing directions RD3, RD4 of the lower alignment layer 35, as shown in FIG. 10.

Next, a method for manufacturing the matrix type of twisted nematic liquid crystal display 31 is briefly described.

FIG. 10 is a diagonal view of the lower and upper alignment layers 35, 36 mounted on the array and opposite substrates 11, 24 shown in FIG. 9, showing the rubbing directions RD3 to RD6 of the lower and upper alignment layers 35, 36.

The array substrate 11 on which the lower polarizer 15, the picture element electrode 17, the gate and source lines 32, 33, the passivation film 18, and the lower alignment layer 35 are mounted is prepared. Also, the opposite substrate 24 on which the common electrode 22, the colored filter 23, the black matrix 38, the upper polarizer 24, and the upper alignment layer 36 are mounted is prepared.

Thereafter, as shown in FIG. 10, an entire surface of the lower alignment layer 35 mounted on the array substrate 11 is rubbed in the rubbing direction RD3 with a piece of cloth made of rayon according to a first rubbing process.

Thereafter, the entire surface of the lower alignment layer 35 is again rubbed in the rubbing direction RD4 inclined at 180 degrees to the rubbing direction RD3 with the cloth according to a second rubbing process.

Thereafter, an entire surface of the upper alignement layer 36 mounted on the opposite substrate 24 is rubbed in the rubbing direction RD5 inclined at 90 degrees to the rubbing direction RD3 with the cloth according to a third rubbing process. In this case, the rubbing direction RD5 is defined by turning the rubbing direction RD3 90 degrees in a clockwise direction.

Thereafter, the entire surface of the upper alignment layer 36 mounted on the opposite substrate 24 is rubbed in the rubbing direction RD6 inclined at 180 degrees to the rubbing direction RD5 with the cloth according to a fourth rubbing process. In this case, the rubbing direction RD6 is defined by turning the rubbing direction RD4 90 degrees in a clockwise direction.

Thereafter, the opposite substrate 24 with the upper alignment layer 36 is attached on the array substrate 11 with the lower alignment layer 35 through a spacer made of glass beads to face the lower alignment layer 35 to the upper alignment layer 36. The distance between the lower and upper alignment layers 35, 36 is 5.0 $\mu$m.

Thereafter, a phenyl cyclohexane type of mixed liquid crystal (No. ZLI-2849 produced by Merck Inc. in Germany) is poured into a space between the lower and upper alignment layers 35, 36 in a vacuum atmosphere. A transition point of the mixed liquid crystal from a nematic liquid crystal phase to an isotropic liquid phase is 95° C.

Thereafter, the mixed liquid crystal poured is heated at a temperature of 110° C. to hold the mixed liquid crystal for 3 minutes at the temperature of 110° C. Therefore, the phase of the mixed liquid crystal becomes the isotropic liquid phase. Thereafter, the mixed liquid crystal is cooled at a room temperature. Therefore, the phase of the mixed liquid crystal is completely changed to the nematic liquid crystal phase so that the liquid crystal layer 37 is made of the mixed liquid crystal having the nematic liquid crystal phase.

As a result, the matrix type of twisted nematic liquid crystal display 31 shown in FIG. 9 is manufactured.

Thereafter, the nematic liquid crystal phase of the liquid crystal layer 37 is observed with a polarization microscope. External forms of the liquid crystal molecules are shown in FIG. 9 as the result of the observation with the polarization microscope.

As shown in FIG. 9, the major axes of the liquid crystal molecules arranged just above the picture element electrode 17 are gradually twisted in a clockwise direction like a spiral staircase along a vertical direction directed from the lower alignment layer 35 to the upper alignment layer 36. As a result, the major axes of the liquid crystal molecules are twisted 90 degrees between the lower and upper alignment layers 35, 36. The reason that the liquid crystal molecules arranged just above the picture element electrode 17 is twisted 90 degrees in the clockwise direction is because the rubbing direction RD5 of the upper alignment layer 36 is inclined 90 degrees to the rubbing direction RD3 of the lower alignment layer 35 in the clockwise direction and because the rubbing direction RD6 of the upper alignment layer 36 is inclined 90 degrees to the rubbing direction RD4 of the lower alignment layer 35 in the clockwise direction. A domain of the liquid crystal layer 37 in which the liquid crystal molecules are twisted in the clockwise direction is called an orderly twisted domain. Also, the liquid crystal molecules in the orderly twisted domain are set in a normal twist condition.

In contrast, the major axes of the liquid crystal molecules arranged just above a region between the picture element electrode 17 and the source line 33 are gradually twisted in a counterclockwise direction along a vertical direction directed from the lower alignment layer 35 to the upper alignment layer 36. The reason that the liquid crystal molecules arranged just above the region between the picture element electrode 17 and the source line 33 are inversely twisted as compared with the liquid crystal molecules arranged in the orderly twisted domain is because the major axes of the liquid crystal molecules arranged just above the region between the picture element electrode 17 and the source line 33 are unstably oriented by a plurality of rubbing processes executed to rub the lower and upper alignment layers 35, 36. Therefore, the liquid crystal molecules arranged in a width of about 5 μm along the source line 32 are inversely twisted. A domain of the liquid crystal layer 37 in which the liquid crystal molecules are inversely twisted is called an inversely twisted domain. Also, the liquid crystal molecules in the inversely twisted domain are set in a inverse twist condition.

Next, an operation executed in the matrix type of twisted nematic liquid crystal display 31 shown in FIG. 9 is described.

In cases where any electric potential is not applied to the picture element electrode 17 because the transistor 18 is turned off, no vertical electric field is induced between the picture element electrode 17 and the common electrode 22. However, because a pulse signal are transmitted through the gate line 32, the first lateral electric field is induced between the picture element electrode 17 and the gate line 32. Also, because an electric potential is always applied to the source line 33, the second lateral electric field is induced between the picture element electrode 17 and the source line 33. Therefore, the lateral electric filed is always concentrated on the edges of the picture element electrode 17.

When the intensity of the electric potential applied to the source line 33 is increased to control the orientation displacement of the major axes of the liquid crystal molecules, the liquid crystal molecules arranged adjacent to the edges of the picture element electrode 17 are set to the reverse tilt condition. However, the reverse tilt condition of the liquid crystal molecules arranged in the inversely twisted domain can not be diffused to the liquid crystal molecules arranged in the orderly twisted domain. The reason that the reverse tilt condition can not be diffused towards the orderly twisted domain is described as follows.

A boundary between the orderly twisted domain and the inversely twisted domain is regarded as a potential barrier to the elastic deformation of the liquid crystal molecules because an elastic energy of the liquid crystal molecules is concentrated on the boundary. Therefore, the liquid crystal molecules arranged adjacent to the edges of the picture element electrode 17 is energetically separated from the liquid crystal molecules arranged just above the picture element electrode 17 by the boundary. Accordingly, because the boundary prevents the elastic deformation of the liquid crystal molecules from being diffused to the orderly twisted domain, the normal tilt condition of the liquid crystal molecules arranged in the orderly twisted domain is not changed to the reverse tilt condition even though the liquid crystal molecules arranged adjacent to the edges of the picture element electrode 17 are set to the reverse tilt condition.

As a result, the inverse disclination line is not generated in the orderly twisted domain. Also, the incident white light passing through the inversely twisted domain is shielded by the black matrix 38. Therefore, the contrast of the image displayed on the matrix type of twisted nematic liquid crystal display 31 according to the first embodiment is superior.

In addition, because the reverse tilt condition of the liquid crystal molecules arranged in the inversely twisted domain can not be diffused to the liquid crystal molecules arranged in the orderly twisted domain, the inversely twisted domain is limited to a small domain. Therefore, a small size of black matrix is enough to shield the incident white light passing through the orderly twisted domain. As a result, a display area shielded by the black matrix 38 can be set to be considerably small as compared with the entire surface of the picture element 34. Therefore, the brightness does not deteriorates.

In the first embodiment, the inversely twisted domain is formed along the source line 33. However, the inversely twisted domain is also formed along the gate line 32 to prevent an adverse influence of the first lateral electric field.

Also, it is preferred that the liquid crystal be made of fluorinated liquid crystal materials (No. ZLI-5080 and ZLI-5091 produced by Merck Inc. in Germany).

2. First Comparative Example

A first comparative example implemented according to the conventional rubbing process is described to compare with the first embodiment.

Figure 11:
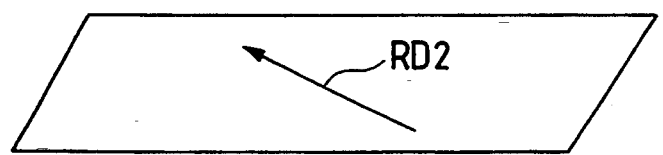
FIG. 11 is a diagonal view of lower and upper aliment layers mounted on array and opposite substrates, showing rubbing directions RD1, RD2 of the lower and upper alinment layers.
Figure 11:
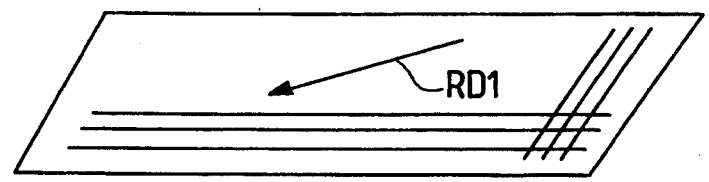
Figure 12:
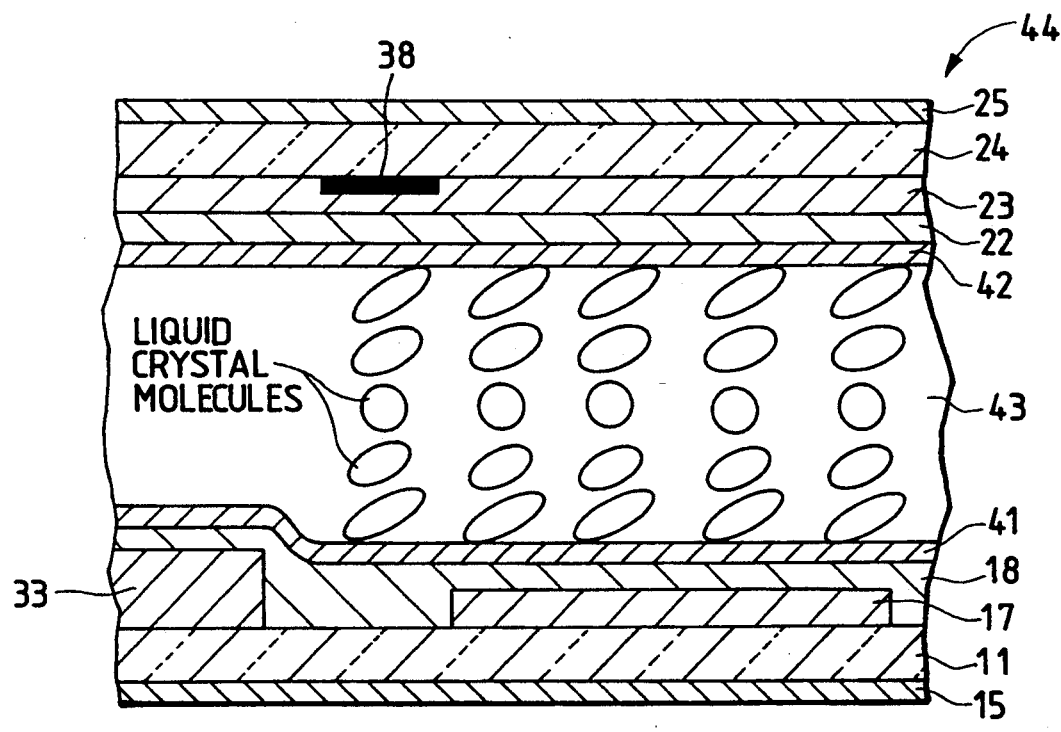
FIG. 12 is a sectional view of one of picture elements arranged in a matrix type of twisted nematic liquid crystal display manufactured according to the first comparative example.

FIG. 11 is a diagonal view of lower and upper alignment layers 41, 42 mounted on the array and opposite substrates 11, 24, showing the rubbing directions RD1, RD2 of the lower and upper alignment layers 41, 42. FIG. 12 is a sectional view of one of picture elements arranged in a matrix type of twisted nematic liquid crystal display manufactured according to the first comparative example.

The array substrate 11 on which the lower polarizer 15, the picture element electrode 17, the gate and source lines 32, 33 and the lower alignment layer 41 are mounted is prepared. Also, the opposite substrate 24 on which the common electrode 22, the colored filter 23, the black matrix 38, the upper polarizer 24, and the upper alignment layer 42 are mounted is prepared.

Thereafter, as shown in FIG. 11, an entire surface of the lower alignment layer 41 mounted on the array substrate 11 is rubbed in the rubbing direction RD1 with a piece of cloth made of rayon. The rubbing direction RD1 is inclined at 45 degrees to the gate and source lines 32, 33.

Thereafter, an entire surface of the upper alignment layer 42 mounted on the opposite substrate 24 is rubbed in the rubbing direction RD2 inclined at 90 degrees to the rubbing direction RD1 with the cloth. In this case, the rubbing direction RD2 is defined by turning the rubbing direction RD1 90 degrees in a clockwise direction.

Thereafter, the opposite substrate 24 with the upper alignment layer 42 is attached on the array substrate 11 with the lower alignment layer 41 through glass beads functioning as a spacer to face the lower alignment layer 41 to the upper alignment layer 42. The distance between the lower and upper alignment layers 41, 42 is 5.0 || m. Thereafter, the phenyl cyclohexane type of mixed liquid crystal (No. ZLI-2849 produced by Merck Inc. in Germany) is poured into a space between the lower and upper alignment layers 41, 42 in a vacuum atmosphere. A transition point of the mixed liquid crystal from a nematic liquid crystal phase to an isotropic liquid phase is 95° C.

Thereafter, the mixed liquid crystal poured is heated at a temperature of 110° C. to hold the mixed liquid crystal for 3 minutes at the temperature of 110° C. Therefore, the phase of the mixed liquid crystal becomes the isotropic liquid phase. Thereafter, the mixed liquid crystal is cooled at a room temperature. Therefore, the phase of the mixed liquid crystal is completely changed to the nematic liquid crystal phase so that a liquid crystal layer 43 is made of the mixed liquid crystal having the nematic liquid crystal phase.

As a result, a matrix type of twisted nematic liquid crystal display of which a picture element 44 is shown in FIG. 12 is manufactured according to the first comparative example.

Thereafter, the nematic liquid crystal phase of the liquid crystal layer 43 is observed with a polarization microscope. External forms of the liquid crystal molecules are shown in Fig, 12 as the result of the observation with the polarization microscope.

As shown in FIG. 12, as the liquid crystal molecules in the liquid crystal layer 43 is positioned far from the lower alignment layer 41 towards the upper alignment layer 42, the major axes of the liquid crystal molecules are gradually twisted in a clockwise direction. As a result, the major axes of the liquid crystal molecules arranged in the entire liquid crystal layer 43 are twisted 90 degrees between the lower and upper alignment layers 41, 42. The reason that the liquid crystal molecules is twisted 90 degrees in the clockwise direction is because the rubbing direction RD2 of the upper alignment layer 42 is inclined 90 degrees to the rubbing direction RD1 of the lower alignment layer 41 in the clockwise direction.

Next, an operation executed in the picture element 44 is described.

In cases where any electric potential is not applied to the picture element electrode 17, no vertical electric field is induced between the picture element electrode 17 and the common electrode 22. However, the first lateral electric field is induced between the picture element electrode 17 and the gate line 32, and the second lateral electric field is induced between the picture element electrode 17 and the source line 33 in the same manner as in the first embodiment. Therefore, the lateral electric filed is always concentrated on the edges of the picture element electrode 17.

When the intensity of the electric potential applied to the source line 33 is increased to control the orientation displacement of the major axes of the liquid crystal molecules, the liquid crystal molecules arranged adjacent to the edges of the picture element electrode 17 are strongly set to the reverse tilt condition. Thereafter, the reverse twist condition of the liquid crystal molecules is diffused to the liquid crystal molecules arranged over the picture element electrode 17 while the liquid crystal molecules strongly set to the reverse twist condition are changed to the liquid crystal molecules weakly set to the reverse twist condition. As a result, the reverse tilt disclination line is generated just above the picture element electrode 17 when a vertical electric field is generated between the picture element electrode 17 and the common electrode 22.

Thereafter, regardless of whether an electric potential is applied to the picture element electrode 17, the incident white light always passes through the liquid crystal molecules arranged adjacent to the reverse tilt disclination line. Therefore, a piece of colored light produced from the incident white light passing through the liquid crystal molecules in the colored filter 23 is radiated from the picture element 44.

Accordingly, the contrast of the image displayed on the matrix type of twisted nematic liquid crystal display according to the first comparative example deteriorates.

As a result of a comparison between the first embodiment and the first comparative example, it is realized that the contrast of the image can be enhanced by the inversely twisted domain positioned between the source or gate line 32, 33 and the picture element electrode 17.

3. Second Embodiment

Figure 13:
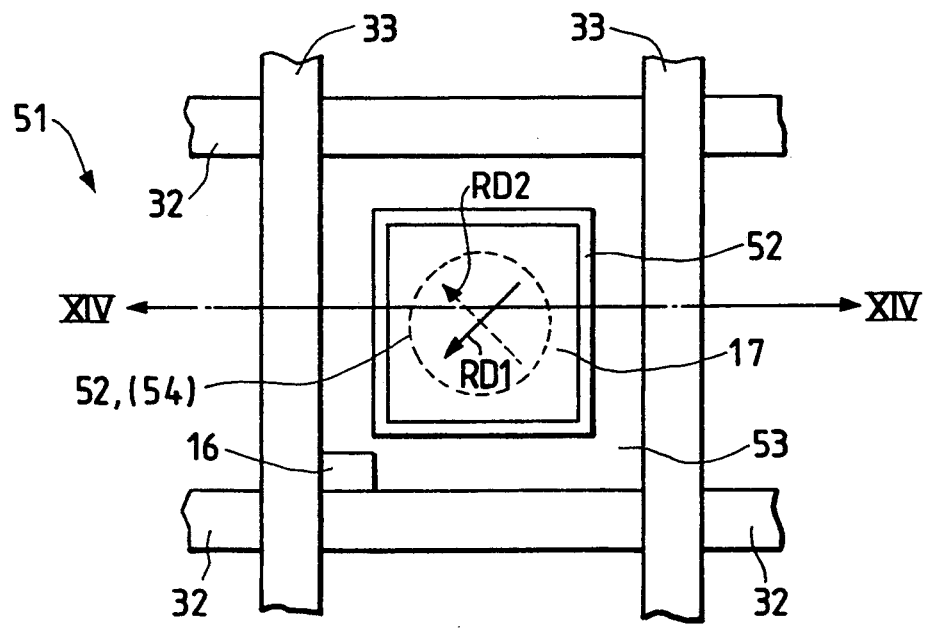
FIG. 13 is a plan view of a picture element arranged in a matrix type of twisted nematic liquid crystal display according to a second embodiment of the present invention.
Figure 14:
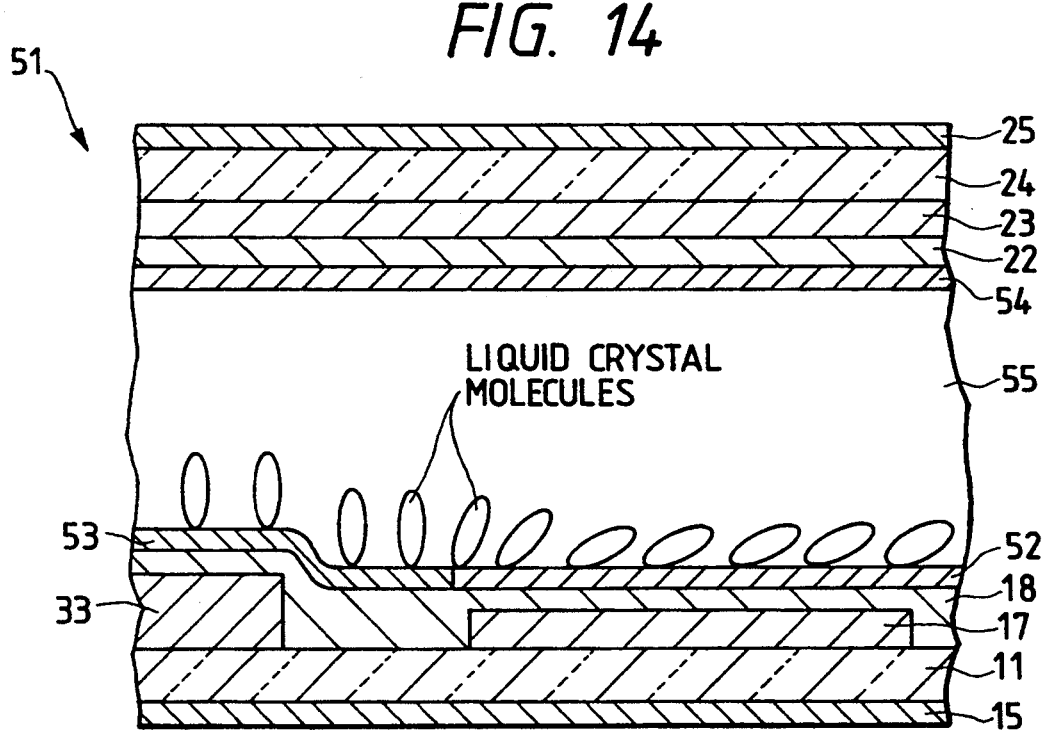
FIG. 14 is a sectional view of the picture element shown in FIG. 13, the sectional view being taken generally along the line XIV—XIV of FIG. 13.

FIG. 13 is a plan view of a picture element arranged in a matrix type of twisted nematic liquid crystal display according to a second embodiment of the present invention. FIG. 14 is a sectional view of the picture element 51 shown in FIG. 13, the sectional view being taken generally along the line XIV—XIV of FIG. 13.

A matrix type of twisted nematic liquid crystal display according to a second embodiment, comprises a large number of picture elements 51 divided by the gate and source lines 32, 33 mounted on the array substrate 11, in the same manner as in the first embodiment shown in FIG. 7.

As shown in FIGS. 13, 14, each of picture elements 51 arranged in the twisted nematic liquid crystal display according to the second embodiment, comprises the gate line 32, the source line 33, the thin type of amorphous silicon transistor 16 connected with the gate and source lines 32, 33, the picture element electrode 17 connected with the source line 33 through the amorphous silicon transistor 16, the lower polarizer 15, the array substrate 11, the passivation film a first lower alignment layer 52 arranged over the picture element electrode 17, a second lower alignment layer 53 arranged over the array substrate 11 to surround the first lower alignment layer 52, an upper alignment layer 54 arranged over the first and second lower alignment layers 53, 54 through a spacer formed of glass beads, a liquid crystal layer 55 in which mixed liquid crystal is filled up between the lower and upper alignment layers 52 to 54, the common electrode 22, the colored filter 23, the opposite substrate 24, and the upper polarizer 25.

The first lower alignment layer 52 and the upper alignment layer 54 are respectively made of a sheet of polyimide alignment film A produced by Nissan Kagaku Inc. in Japan (products No. SE7311). Therefore, a liquid crystal molecule is arranged on the first lower alignment layer 52 at a pretilt angle PA1 of about 2 degrees.

The second lower alignment layer 53 is made of a sheet of polyimide alignment film B produced by Merck Inc. in U.S.A. (products No. ZLI3334). Therefore, a liquid crystal molecule is arranged on the second lower alignment layer 53 in a homeotropic orientation. That is, the liquid crystal molecule is arranged at a pretilt angle PA2 of almost 90 degrees.

In the above configuration, each of the transistors 16 is turned on by receiving a pulse signal from one of the gate lines 32, so that an electric potential is applied to the picture element electrode 17 from the source line 33 through the transistor 16.

Next, a method for manufacturing the matrix type of twisted nematic liquid crystal display according to the second embodiment is briefly described.

The amorphous silicon transistor 16 is made in the array substrate 11 according to an epitaxial process conventionally utilized, and the gate and source lines 32, 33 and the picture element electrode 17 are made on the array substrate 11 according to a deposition process and an etching process conventionally utilized. Thereafter, the passivation film 18 is deposited over the entire array substrate 11 to insulate the picture element electrode 17 from the gate and source lines 32, 33. Therefore, the array substrate 11 on which the lower polarizer 15, the gate and source line 32, 33, the amorphous silicon transistor 16, the picture element electrode 17, and the passivation film 18 are mounted is prepared.

Also, the opposite substrate 24 on which the common electrode 22, the colored filter 23, and the upper polarizer 25 is mounted is prepared.

Thereafter, the polyimide alignment film A is printed on the passivation film 18 according to a screen process printing. The thickness of the polyimide alignment film A printed is about 1000 angstroms.

Also, the polyimide alignment film A is printed on the common electrode 22 of the opposite substrate 24 according to the screen process printing. The thickness of the polyimide alignment film A printed is about 1000 angstroms.

Thereafter, the polyimide alignment films A printed on the passivation film 18 and the common electrode 22 are cured in an electric furnace. Thereafter, a patterned mask is covered on the polyimide alignment film A printed on the passivation film 18 other than the polyimide alignment film A arranged over the picture element electrode 17 so that an organic resist is coated on the polyimide alignment film A arranged over the picture element electrode 17 to prevent the polyimide alignment film A arranged over the picture element electrode 17 from being etched. After the mask is washed away, the polyimide alignment film A printed on the passivation film 18 other than the polyimide alignment film A arranged over the picture element electrode 17 is etched. Therefore, only the polyimide alignment film A arranged over the picture element electrode 17 remains.

Thereafter, the polyimide alignment film B is coated on the passivation film 18 other than the passivation film 18 arranged on the picture element electrode 17. Thereafter, the polyimide alignment film B coated on the passivation film 18 is held in the electric furnace for one hour and at a temperature of 200° C., so that the polyimide alignment film B is cured.

Therefore, as shown in FIG. 13, the polyimide alignment film A cured is coated over the picture element electrode 17, and the polyimide alignment film B cured is coated on the passivation film 18 to surround the polyimide alignment film A.

Thereafter, entire surfaces of the first and second lower alignment layers 52, 53 mounted on the array substrate 11 are simultaneously rubbed in the rubbing direction RD1 with a piece of nylon fabric. The rubbing direction RD1 is inclined at 45 degrees to the gate and source lines 32, 33.

Thereafter, an entire surface of the upper alignment layer 54 mounted on the opposite substrate 24 is rubbed in the rubbing direction RD2 inclined at 90 degrees to the rubbing direction RD1 with the nylon fabric. In this case, the rubbing direction RD2 is defined by turning the rubbing direction RD1 90 degrees in a clockwise direction.

Thereafter, the opposite substrate 24 with the upper alignment layer 54 is attached on the array substrate 11 with the first and second lower alignment layers 52, 53 through a spacer made of glass beads to face the first and second lower alignment layers 52, 53 to the upper alignment layer 54. The distance between the lower and upper alignment layers is 5.0 μm.

Thereafter, the phenyl cyclohexane type of mixed liquid crystal (No. ZLI-2849 produced by Merck Inc. in Germany) is poured into a space between the lower and upper alinment layers 52, 53, 54 in a vacuum atmosphere. A transition point of the mixed liquid crystal from a nematic liquid crystal phase to an isotropic liquid phase is 95° C.

Thereafter, the mixed liquid crystal poured is heated at a temperature of 110° C. to hold the mixed liquid crystal for 3 minutes at the temperature of 110° C. Therefore, the phase of the mixed liquid crystal becomes the isotropic liquid phase. Thereafter, the mixed liquid crystal is cooled at a room temperature. Therefore, the phase of the mixed liquid crystal is completely changed to the nematic liquid crystal phase so that the liquid crystal layer 55 is made of the mixed liquid crystal having the nematic liquid crystal phase.

As a result, the twisted nematic liquid crystal display of which the picture element 51 is shown in FIGS. 13, 14 is manufactured according to the second embodiment.

Thereafter, the nematic liquid crystal phase of the liquid crystal layer 55 is observed with a polarization microscope. External forms of the liquid crystal molecules are shown in FIG. 14 as the result of the observation with the polarization microscope.

As shown in FIG. 14, the major axes of the liquid crystal molecules which are arranged on the first lower alignment layer 52 and are arranged far from the second lower alignment layer 53 are oriented at a pretilt angle PA1 of about 2 degrees. Also, the major axes of the liquid crystal molecules arranged on the second lower alignment layer 53 are oriented at a pretilt angle PA2 of about 90 degrees. In other words, the major axes of the liquid crystal molecules arranged on the second lower alignment layer 53 are oriented according to a homeotropic orientation.

In addition, the pretilt angles of the liquid crystal molecules arranged on the first lower alignment layer 52 are increased along a lateral direction directed from the first lower alignment layer 52 to the second lower alignment layer 53. In other words, the major axes of the liquid crystal molecules arranged adjacent to the edges of the picture element electrode 17 are oriented at a pretilt angle PA3 which is considerably larger than the pretilt angle PA1 of the liquid crystal molecules arranged on the middle of the first lower alignment layer 52.

Also, the major axes of the liquid crystal molecules arranged on the first lower alignment layer 52 are gradually twisted in a clockwise direction like a spiral staircase along vertical direction directed from the first lower alignment layer 82 to the upper alignment layer 54. As a result, the major axes of the liquid crystal molecules which are arranged in the liquid crystal layer 55 positioned on the first lower alignment layer 82 are twisted 90 degrees between the lower and upper alignment layers 52, 54. The reason that the liquid crystal molecules is twisted 90 degrees in the clockwise direction is because the rubbing direction RD2 of the upper alignment layer 84 is inclined 90 degrees to the rubbing direction RD1 of the first lower alignment layer 52 in the clockwise direction.

Next, an operation executed in the matrix type of twisted nematic liquid crystal display according to the second embodiment is described.

In cases where any electric potential is not applied to the picture element electrode 17 because the transistor 16 is turned off, no vertical electric field is induced between the picture element electrode 17 and the common electrode 22. However, because a pulse signal are transmitted through the gate line 82, the first lateral electric field is induced between the picture element electrode 17 and the gate line Also, because an electric potential is always applied to the source line 33, the second lateral electric field is induced between the picture element electrode 17 and the source line 33. Therefore, the lateral electric filed is always concentrated on the edges of the picture element electrode 17.

When the intensity of the electric potential applied to the source line 33 is increased to control the orientation displacement of the major axes of the liquid crystal molecules, the intensity of the lateral electric field is increased. Therefore, the lateral electric field influences the liquid crystal molecules arranged adjacent to the edges of the picture element electrode 17 to be set to the reverse tilt condition. However, because the major axes of the liquid crystal molecules are oriented at the pretilt angle PA3 considerably larger than the pretilt angle PA1, the liquid crystal molecules arranged adjacent to the edges of the picture element electrode 17 are not set to the reverse tilt condition. Therefore, no reverse tilt condition is generated.

As a result, no tilt disclination line is generated over the entire liquid crystal molecules of the liquid crystal layer 55.

Accordingly, the contrast of the image displayed on the twisted nematic liquid crystal display according to the second embodiment is superior because no tilt disclination line is generated in the liquid crystal layer 51.

Also, because no tilt disclination line is generated in the liquid crystal layer 51, no black matrix is required so that the image can be displayed in a high brightness.

In the second embodiment, the alignment layer B having homeotropic orientation characteristics is arranged around the picture element electrode 17 according to the etching process. However, it is preferred that an alignment layer having orientation characteristics in which a pretilt angle of a liquid crystal molecule is changed by radiating light to the film be coated over the entire array substrate 11 before the light is radiated to liquid crystal molecules arranged over the picture element electrode 17 or arranged around the picture element electrode 17 to change the pretilt angle of the liquid crystal molecules In this case, two types of alignment layers can be easily arranged over the array substrate 11.

Also, the alignment layer 52 is not limited to the polyimide alignment film A (product No. SE7311). That is, it is preferred that another alignment layer having orientation characteristics in which a pretilt angle of a liquid crystal molecule is several degrees be utilized in place of the polyimide alignment film A.

Also, the alignment layer 53 is not limited to the polyimide alignment film B (products No. ZLI3334). That is, another alignment layer on which a liquid crystal molecule is arranged in a homeotropic orientation can be utilized. For example, it is preferred that hexadecyl amine is utilized in place of the alignment film B.

Also, it is preferred that the liquid crystal be made of fluorinated liquid crystal materials (No. ZLI-5080 and ZLI-5091 produced by Merck Inc. in Germany).

Furthermore, the liquid crystal molecules arranged between the picture element electrode 17 and the gate line 32 are oriented at the pretilt angle of 90 degrees, and the liquid crystal molecules arranged between the picture element electrode 17 and the source line 33 are oriented at the pretilt angle of 90 degrees. However, it is preferred that an only group of liquid crystal molecules arranged between the picture element electrode 17 and the gate line 32 be oriented at the pretilt angle of 90 degrees. Also, it is preferred that an only group of liquid crystal molecules arranged between the picture element electrode 17 and the source line 33 be oriented at the pretilt angle of 90 degrees.

4. Second Comparative Example

A second comparative example in which a matrix type of twisted nematic liquid crystal display is provided with a type of alignment layers is described to compare with the second embodiment.

Figure 15:
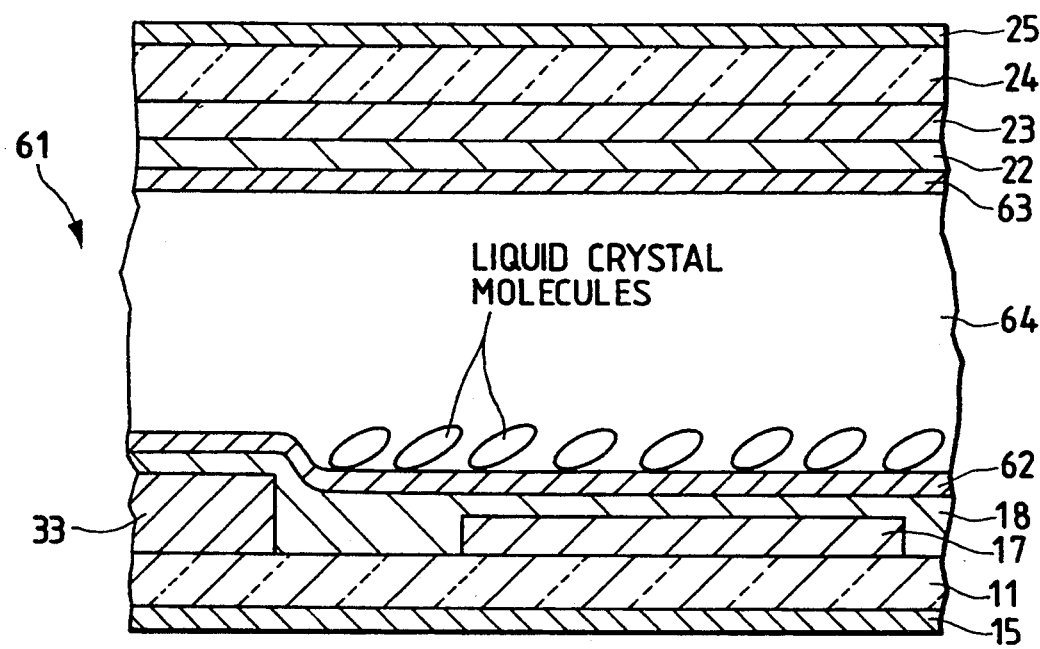
FIG. 15 is a sectional view of a picture element arranged in a matrix type of twisted nematic liquid crystal display according to a second comparative example.

FIG. 15 is a sectional view of a picture element arranged in a matrix type of twisted nematic liquid crystal display according to the second comparative example.

As shown in FIG. 15, a picture element 61 arranged in a matrix type of twisted nematic liquid crystal display according to the second comparative example, comprises the gate line 32 (not shown), the source line 33, the thin type of amorphous silicon transistor 16 (not shown) connected with the gate and source lines 32, 33, the picture element electrode 17 connected with the source line 33 through the amorphous silicon transistor 16, the lower polarizer 15, the array substrate 11, the passivation film 18, a lower alignment layer 62 arranged on the entire passivation film 18, an upper alignment layer 63 arranged over the lower alignment layer 62 through a spacer (not shown) formed of glass beads, a liquid crystal layer 64 in which mixed liquid crystal is filled up between the lower and upper alignment layers 62, 63, the common electrode 22, the colored filter 23, the opposite substrate 24, and the upper polarizer 25.

The lower alignment layer 62 and the upper alignment layer 63 are respectively made of the polyimide alignment film A produced by Nissan Kagaku Inc. in Japan (products No. SE7311). Therefore, a liquid crystal molecule is arranged on the lower alignment layer 52 at the pretilt angle PA1 of about 2 degrees.

Next, a method for manufacturing the matrix type of twisted nematic liquid crystal display according to the second comparative example is briefly described.

The array substrate 11 on which the lower polarizer 15, the gate and source line 32, 33, the amorphous silicon transistor 16, the picture element electrode 17, and the passivation film 18 are mounted is prepared.

Also, the opposite substrate 24 on which the common electrode 22, the colored filter 23, and the upper polarizer 25 is mounted is prepared.

Thereafter, the polyimide alignment film A is printed on the passivation film 18 according to the screen process printing. The thickness of the polyimide alignment film A printed is about 1000 angstroms.

Also, the polyimide alignment film A is printed on the common electrode 22 of the opposite substrate 24 according to the screen process printing. The thickness of the polyimide alignment film A printed is about 1000 angstroms.

Thereafter, the polyimide alignment film A printed on the passivation film 18 and the common electrode 22 are cured in an electric furnace.

Thereafter, an entire surface of the lower alignment layer 62 mounted on the array substrate 11 is rubbed in the rubbing direction RD1 with a piece of nylon fabric. The rubbing direction RD1 is inclined at 45 degrees to the gate and source lines 32, 33.

Thereafter, an entire surface of the upper alignment layer 63 mounted on the opposite substrate 24 is rubbed in the rubbing direction RD2 inclined at 90 degrees to the rubbing direction RD1 with the nylon fabric. In this case, the rubbing direction RD2 is defined by turning the rubbing direction RD1 90 degrees in a clockwise direction.

Thereafter, the opposite substrate 24 with the upper alignment layer 63 is attached on the array substrate 11 with the lower alignment layer 62 through a spacer made of glass beads to face the lower alignment layers 62 to the upper alignment layer 63. The distance between the lower and upper alignment layers 62, 63 is 5.0 μm.

Thereafter, the phenyl cyclohexane type of mixed liquid crystal (No. ZLI-2849 produced by Merck Inc. in Germany) is poured into a space between the lower and upper alignment layers 62, 63 in a vacuum atmosphere.

Thereafter, the mixed liquid crystal poured is heated at a temperature of 110° C. to hold the mixed liquid crystal for 3 minutes at the temperature of 110° C. Thereafter, the mixed liquid crystal is cooled at a room temperature. Therefore, the liquid crystal layer 64 is made of the mixed liquid crystal having the nematic liquid crystal phase.

As a result, the twisted nematic liquid crystal display of which the picture element 61 is shown in FIG. 15 is manufactured according to the second comparative example.

Thereafter, the nematic liquid crystal phase of the liquid crystal layer 64 is observed with a polarization microscope. External forms of the liquid crystal molecules are shown in FIG. 15 as the result of the observation with the polarization microscope.

As shown in FIG. 15, the major axes of the liquid crystal molecules arranged on the lower alignment layer 62 are oriented at a pretilt angular PA1 of about 2 degrees.

Also, the major axes of the liquid crystal molecules are gradually twisted in a clockwise direction along a vertical direction directed from the lower alignment layer 62 to the upper alignment layer 63. As a result, the major axes of the liquid crystal molecules arranged in the entire liquid crystal layer 64 are twisted 90 degrees between the lower and upper alignment layers 62, 63.

Next, an operation executed in the matrix type of twisted nematic liquid crystal display according to the second comparative example is described.

In cases where any electric potential is not applied to the picture element electrode 17, no vertical electric field is induced between the picture element electrode 17 and the common electrode 22. However, the lateral electric field is always concentrated on the edges of the picture element electrode 17 in the same manner as in the second embodiment.

When the intensity of the electric potential applied to the source line 33 is increased to control the orientation displacement of the major axes of the liquid crystal molecules, liquid crystal molecules arranged adjacent to the edges of the picture element electrode 17 are strongly set to the reverse tilt condition. Thereafter, other liquid crystal molecules set in the normal tilt condition which are arranged on the picture element electrode 17 and are positioned adjacent to the liquid crystal molecules strongly set in the reverse tilt condition are weakly set to the reverse tilt condition one after another while the liquid crystal molecules strongly set to the reverse tilt condition are weakly reset to the reverse tilt condition.

Thereafter, when a vertical electric field is induced, the major axes of the liquid crystal molecules which are arranged on the picture element electrode 17 and are weakly set in the reverse tilt condition are vertically oriented. Also, when the vertical electric field is induced, the major axes of the liquid crystal molecules which are arranged on the picture element electrode 17 and are set in the normal tilt condition are also vertically oriented. Therefore, a tilt disclination line is generated between the liquid crystal molecules weakly set in the reverse tilt condition and the liquid crystal molecules set in the normal tilt condition.

Accordingly, even though the vertical electric field is induced, a piece of incident white light passing through liquid crystal molecules arranged adjacent to the reverse tilt disclination line is circularly polarized so that colored light is radiated from the picture element 61. Therefore, the contrast of the image deteriorates.

As a result of a comparison between the second embodiment and the second comparative example, it is realized that the field induced between the source line 33 and the picture element electrode 17 on the liquid crystal molecules. That is, the generation of a reverse tilt disclination line is suppressed by initially orienting the liquid crystal molecules in an optimum direction.

Figure 16:
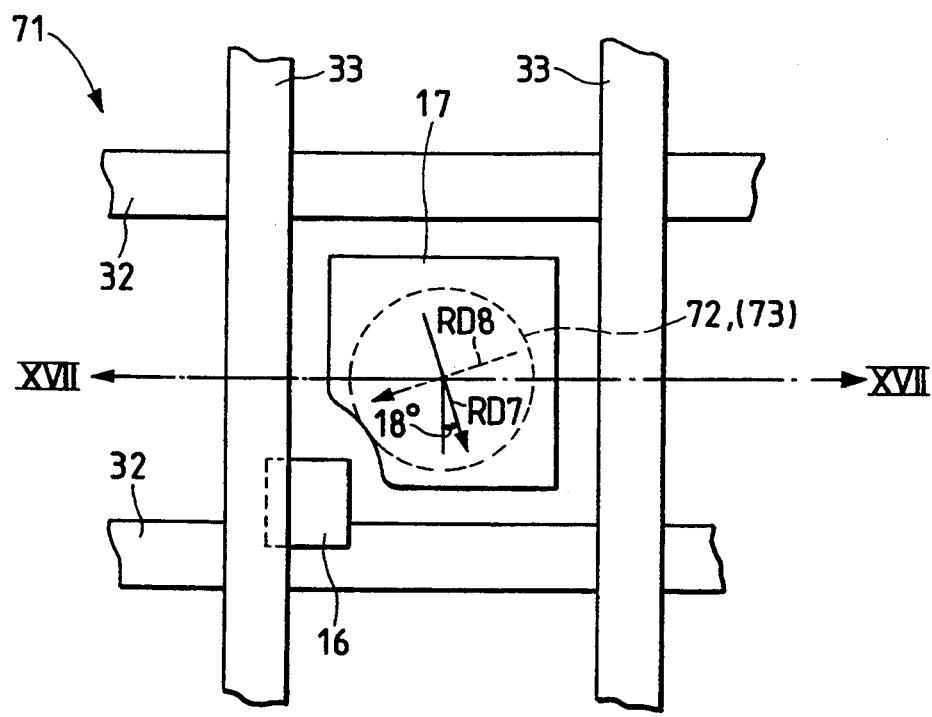
FIG. 16 is a plan view of a picture element arranged in a matrix type of twisted nematic liquid crystal display according to a third embodiment of the present invention.
Figure 17:
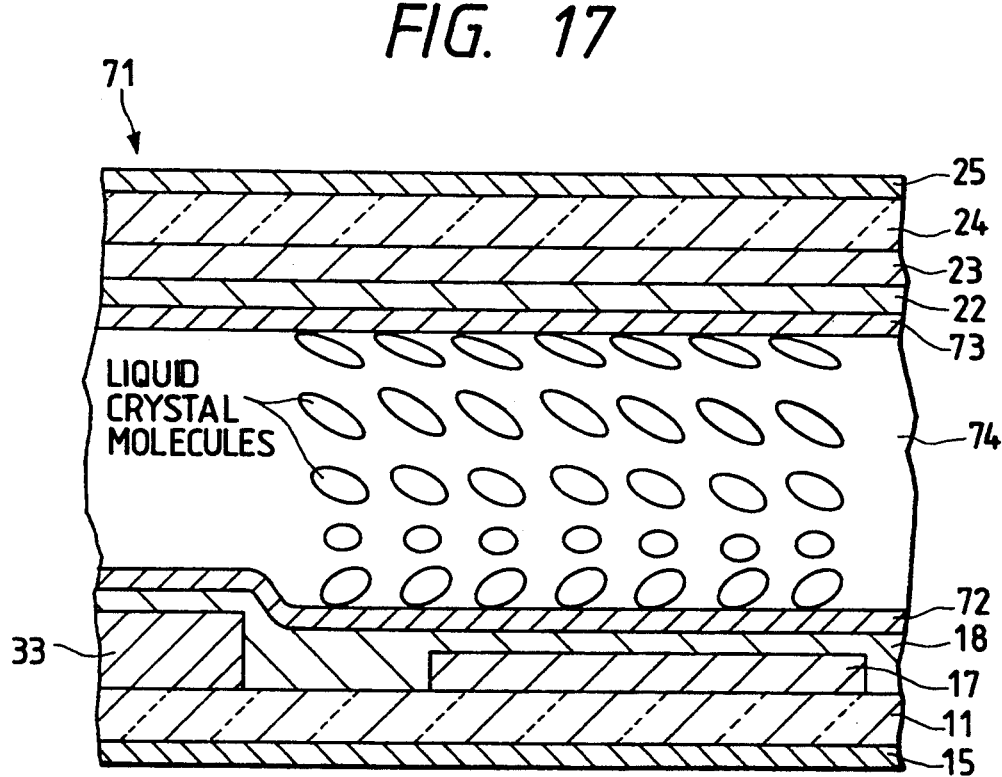
FIG. 17 is a sectional view of the picture element shown in FIG. 16, the sectional view being taken generally along the line XVII≧XVII of FIG. 16.

FIG. 16 is a plan view of a picture element arranged in a matrix type of twisted nematic liquid crystal display according to a third embodiment of the present invention. FIG. 17 is a sectional view of the picture element shown in FIG. 16, the sectional view being taken generally along the line XVII—XVII of FIG. 16.

A matrix type of twisted nematic liquid crystal display according to a third embodiment, comprises a large number of picture elements 71 divided by the gate and source lines 32, 33 mounted on the array substrate 11, in the same manner as in the first embodiment shown in FIG. 7.

As shown in FIGS. 16, 17, each of picture elements 71 arranged in the twisted nematic liquid crystal display according to the third embodiment, comprises the gate line the source line 33, the thin type of amorphous silicon transistor 16 connected with the gate and source lines 32, 33, the picture element electrode 17 connected with the source line 33 through the amorphous silicon transistor 16, the lower polarizer 15, the array substrate 11, the passivation film 18, a lower alignment layer 72 arranged over the picture element electrode 17, an upper alignment layer 73 arranged over the lower alignment layer 72 through a spacer formed of glass beads, a liquid crystal layer 74 in which mixed liquid crystal is filled up between the lower and upper alignment layers 72, 73, the common electrode 22, the colored filter 23, the opposite substrate 24, and the upper polarizer 25.

The lower alignment layer 72 and the upper alignment layer 73 are respectively made of a sheet of polyimide alignment film A produced by Nissan Kagaku Inc. in Japan (products No. SE7311). Therefore, liquid crystal molecules are arranged on the lower and upper alignment layers 72, 73 at the pretilt angle PA1 of about 2 degrees.

The lower alignment layer 72 is rubbed in a rubbing direction RD7 which is inclined to the source line 33 at 18 degrees in a counterclockwise direction, as shown in FIG. 16.

The upper alignment layer 73 is rubbed in a rubbing direction RD8 which is defined by turning the rubbing direction RD7 90 degrees in a clockwise direction, as shown in FIG. 16.

In the above configuration, each of the transistors 16 is turned on by receiving a pulse signal from one of the gate lines 32, so that an electric potential is applied to the picture element electrode 17 from the source line 33 through the transistor 16.

Next, the reason that the lower alignment layer 72 is rubbed in the rubbing direction RD7 is described.

Liquid crystal molecules in the liquid crystal layer 74 are dielectric substances having an anisotropic dielectric constant in major axis directions thereof. Also, the liquid crystal molecules have another anisotropic dielectric constant in minor axis directions. Therefore, in cases where a liquid crystal molecule is set in a lateral electric field induced between the source line 33 and the picture element electrode 17, an attractive-repulsive force exerted on the liquid crystal molecule depends on an angle between a major axis direction of the liquid crystal molecule and a direction of the lateral electric field. That is, the intensity of the attractive-repulsive force is proportional to a product of a lateral electric field intensity and an orthogonal projection length on the lateral electric field of the major axis of the liquid crystal molecule. In other words, the intensity of the attractive-repulsive force is proportional to a scalar product of the lateral electric field and the major axis of the liquid crystal molecule. For example, in cases where a major axis direction of the liquid crystal molecule is at right angles to a direction of the lateral electric field, no force is exerted on the liquid crystal molecule by the lateral electric field. In contrast, in cases where a major axis direction of the liquid crystal molecule is parallel to a direction of the lateral electric field, an attractive-repulsive force exerted on the liquid crystal molecule is maximum.

Therefore, in cases where a scalar product sum obtained by integrating the scalar product in the entire liquid crystal layer 74 is minimum, the adverse influence of the lateral electric field on the liquid crystal molecules in the liquid crystal layer 74 can be minimized.

The scalar product sum is expressed by an equation (1).

$$F = \int v\, E(v) \cdot \cos\theta(v)\, dV \qquad (1)$$

Wherein a symbol F denotes the scalar product sum, a symbol E(v) denotes the intensity of the lateral electric field in an integrated region V, a symbol $\theta(v)$ denotes a crossing angle between a major axis direction of the liquid crystal molecule and a direction of the lateral electric field, and a symbol dV denotes a volumetric integration.

The scalar product sum F mainly depends on the crossing angle $\theta(v)$ in an integrated region Vo in which the intensity of the lateral electric field E(vo) is considerably high as compared with those in other integrated regions.

Also, an intensity distribution of the electric field in the liquid crystal layer 74 is determined by both an electric potential difference between the picture element electrode 17 and the source line 33 and a three-dimensional structure of the picture element electrode 17 and the source line 33.

The integrated region Vo is generally positioned in a lower region of the liquid crystal layer 74.

To determine rubbing directions of the lower and upper alignment layers 72, 73, a large number of experiments were implemented while the rubbing directions are changed many times. As a result of the experiments, it is ascertained that the generation of a reverse tilt disclination line is suppressed when the lower alignment layer 72 is rubbed in rubbing directions ranging within 30 degrees from the source line 33, in cases where an electric voltage applied to the source line 33 is as high as 5 V.

Figure 18:
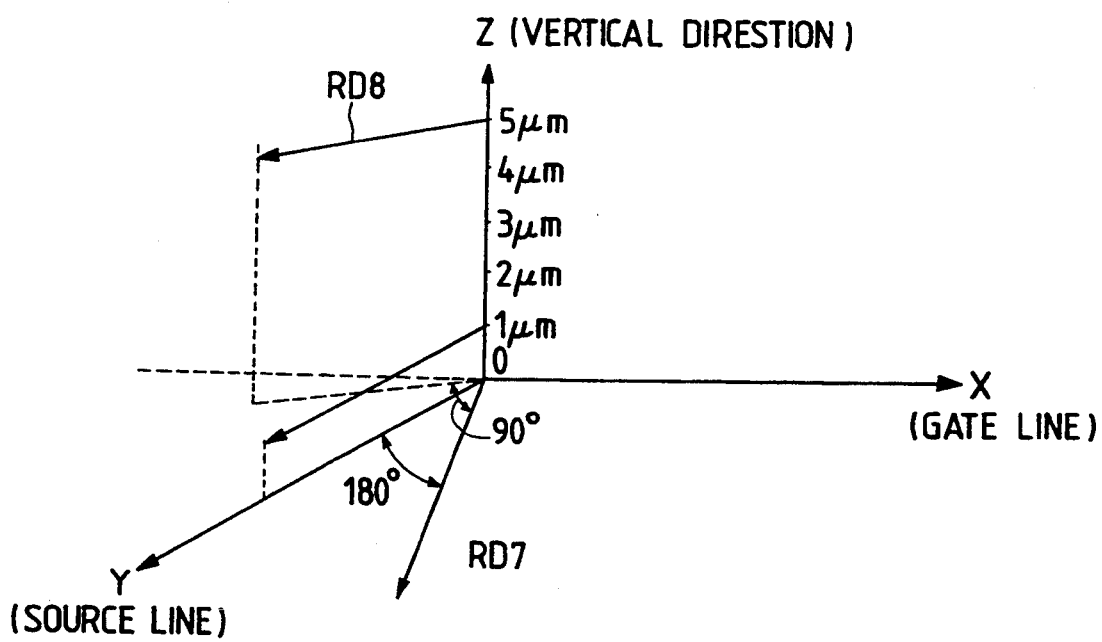
FIG. 18 explanatorily shows major axis directions of liquid crystal molecules gradually twisted in a clockwise direction along a vertical direction directed from a lower alignment layer to an upper alignment layer shown in FIG. 17.

Therefore, as shown in FIG. 18, a major axis direction of a liquid crystal molecule arranged in a height 1 µm higher than that of the lower alignment layer 72 is set to the same direction as the source line 33. That is, because the major axes of the liquid crystal molecules are twisted 90 degrees in a clockwise direction along a vertical direction directed from the lower alignment layer 72 to the upper alignment layer 73, the rubbing direction RD7 of the lower alignment layer 72 is inclined to the source line 33 at 18 degrees (18=90÷5) in a counterclockwise direction.

However, it is generally allowable that the rubbing direction of the lower alignment layer 72 be inclined to the source line 33 at inclined angles ranging from 1 degree to 44 degrees. Also, in cases where the distance between the lower and upper alignment layers 72, 73 is about 5 µm, it is preferred that the rubbing direction of the lower alignment layer 72 be inclined to the source line 33 at inclined angles ranging from 10 degrees to 30 degrees.

Next, a method for manufacturing the matrix type of twisted nematic liquid crystal display according to the third embodiment is briefly described.

The amorphous silicon transistor 16 is made in the array substrate 11 according to an epitaxial process conventionally utilized, and the gate and source lines 32, 33 and the picture element electrode 17 are made on the array substrate 11 according to a deposition process and an etching process conventionally utilized. Thereafter, the passivation film 18 is deposited over the entire array substrate 11 to insulate the picture element electrode 17 from the gate and source lines 32, 33. Therefore, the array substrate 11 on which the lower polarizer 15, the gate and source line 32, 33, the amorphous silicon transistor 16, the picture element electrode 17, and the passivation film 18 are mounted is prepared.

Also, the opposite substrate 24 on which the opposite electrode 22, the colored filter 23, and the upper polarizer 25 is mounted is prepared.

Thereafter, the polyimide alignment film A is printed on the passivation film 18 according to a screen process printing. The thickness of the polyimide alignment film A printed is about 1000 angstroms.

Also, the polyimide alignment film A is printed on the opposite electrode 22 of the opposite substrate 24 according to the screen process printing. The thickness of the polyimide alignment film A printed is about 1000 angstroms.

Thereafter, the polyimide alignment films A printed on the passivation film 18 and the common electrode 22 are cured in an electric furnace.

Thereafter, an entire surface of the lower alignment layer 72 mounted on the array substrate 11 is rubbed in the rubbing direction RD7 with a piece of nylon fabric.

Thereafter, an entire surface of the upper alignment layer 73 mounted on the opposite substrate 24 is rubbed in the rubbing direction RD8 inclined at 90 degrees to the rubbing direction RD7 with the nylon fabric.

Thereafter, the opposite substrate 24 with the upper alignment layer 73 is attached on the array substrate 11 with the lower alignment layer 72 through a spacer made of glass beads to face the lower alignment layer 72 to the upper alignment layer 73. The distance between the lower and upper alignment layers 72, 73 is 5.0 μm.

Thereafter, the phenyl cyclohexane type of mixed liquid poured into a space between the lower and upper alignment layers 72, 73 in a vacuum atmosphere. A transition point of the mixed liquid crystal from a nematic liquid crystal phase to an isotropic liquid phase is 95° C.

Thereafter, the mixed liquid crystal poured is heated at a temperature of 110° C. to hold the mixed liquid crystal for 3 minutes at the temperature of 110° C. Therefore, the phase of the mixed liquid crystal becomes the isotropic liquid phase. Thereafter, the mixed liquid crystal is cooled at a room temperature. Therefore, the phase of the mixed liquid crystal is completely changed to the nematic liquid crystal phase so that the liquid crystal layer 74 is made of the mixed liquid crystal having the nematic liquid crystal phase.

As a result, the twisted nematic liquid crystal display of which the picture element 71 is shown in FIGS. 16, 17 is manufactured according to the third embodiment.

Thereafter, the nematic liquid crystal phase of the liquid crystal layer 74 is observed with a polarization microscope. External forms of the liquid crystal molecules are shown in FIG. 17 as the result of the observation with the polarization microscope.

As shown in FIG. 17, the major axes of the liquid crystal molecules in the liquid crystal layer 74 are oriented at the pretilt angle PA1 of about 2 degrees.

Also, the major axes of the liquid crystal molecules in the liquid crystal layer 74 are gradually twisted in a clockwise direction like a spiral staircase along a vertical direction directed from the lower alignment layer 72 to the upper alignment layer 73. As a result, the major axes of the liquid crystal molecules are twisted 90 degrees between the lower and upper alignment layers 72, 73. The reason that the liquid crystal molecules is twisted 90 degrees in the clockwise direction is because the rubbing direction RD8 of the upper alignment layer 73 is inclined 90 degrees to the rubbing direction RD7 of the first lower alignment layer 72 in the clockwise direction.

Next, an operation executed in the matrix type of twisted nematic liquid crystal display according to the third embodiment is described.

In cases where any electric potential is not applied to the picture element electrode 17 because the transistor 16 is turned off, no vertical electric field is induced between the picture element electrode 17 and the common electrode 22. However, because an electric potential is always applied to the source line 33, a lateral electric field is induced between the picture element electrode 17 and the source line 33. Therefore, the lateral electric filed is always concentrated on the edges of the picture element electrode 17.

In this case, because pulse signals are transmitted through the gate line 32, a first lateral electric field is induced between the picture element electrode 17 and the gate line 32. However, because intervals of the pulse signals are comparatively large, the influence of the first lateral electric field on the liquid crystal molecules can be ignored.

When the intensity of the electric potential applied to the source line 33 is increased to control the orientation displacement of the major axes of the liquid crystal molecules, the intensity of the lateral electric field is increased. Particularly, the intensity of the lateral electric field at lower positions ranging from a height H1 of the lower alignment layer 72 to a height H2 higher than that of the lower alignment layer 72 by 2 μm is remarkably increased.

Figure 5:
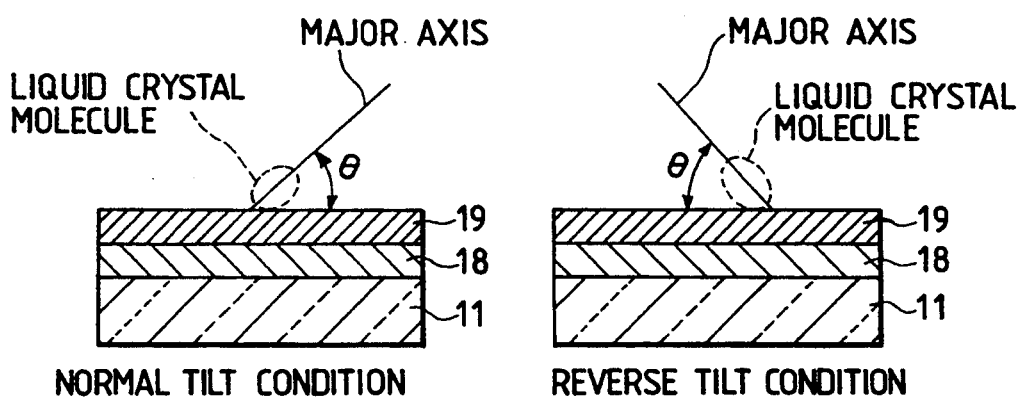
FIG. 5 explanatorily shows a pretilt angle of a liquid crystal molecule generated between a major axis of liquid crystal molecule and a surface of an alignment layer shown in FIG. 3.
Figure 6A:
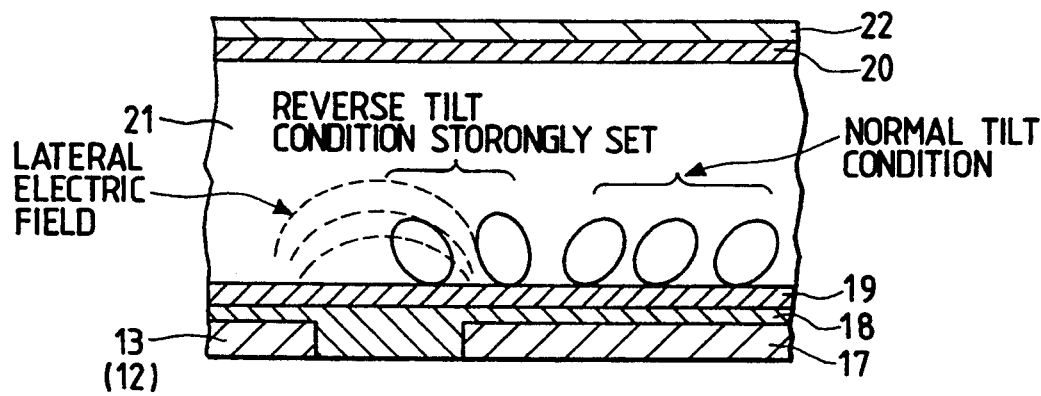
FIGS. 6A, 6B explanatorily show the diffusion of the liquid crystal molecules set in a reverse tilt condition shown in FIG. 5.
Figure 6B:
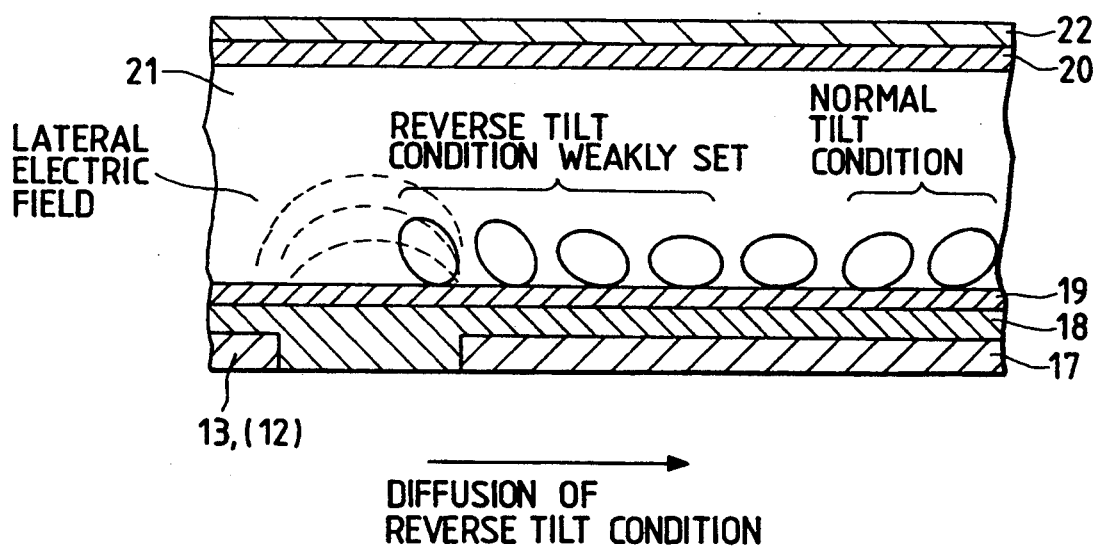

However, because the major axis directions of the liquid crystal molecules arranged at the lower positions ranging from the height H1 to the height H2 are almost parallel to the source line 33, the major axes of the liquid crystal molecules are not changed in a vertical direction. Therefore, the liquid crystal molecules set in the normal tilt condition shown in FIG. 5 are not changed to the liquid crystal molecules set in the reverse tilt condition. Therefore, no reverse tilt condition is generated.

As a result, no tilt disclination line is generated over the entire liquid crystal molecules in the liquid crystal layer 74.

Accordingly, the contrast of the image displayed on the twisted nematic liquid crystal display according to the third embodiment is superior because no tilt disclination line is generated in-the liquid crystal layer 74.

Also, because no tilt disclination line is generated in the liquid crystal layer 74, no black matrix is required so that the image can be displayed in a high brightness.

In the third embodiment, the major axes of the liquid crystal molecules are twisted 90 degrees in a clockwise direction along a vertical direction directed from the lower alignment layer 72 to the upper alignment layer 73. However, it is preferred that the major axes of the liquid crystal molecules be twisted almost 90 degrees on condition that the major axis directions of the liquid crystal molecules arranged at the lower positions ranging from the height H1 to the height H2 are almost parallel to the source line 33.

Also, it is preferred that the liquid crystal be made of fluorinated liquid crystal materals.

6. Fourth Embodiment

In a fourth embodiment, liquid crystal molecules are initially oriented to minimize influence of a lateral electric field induced between the gate line 32 and the picture element electrode 17 on the liquid crystal molecules. That is, the generation of a reverse tilt disclination line is suppressed by initially orienting the liquid crystal molecules in an optimum direction.

Figure 19:
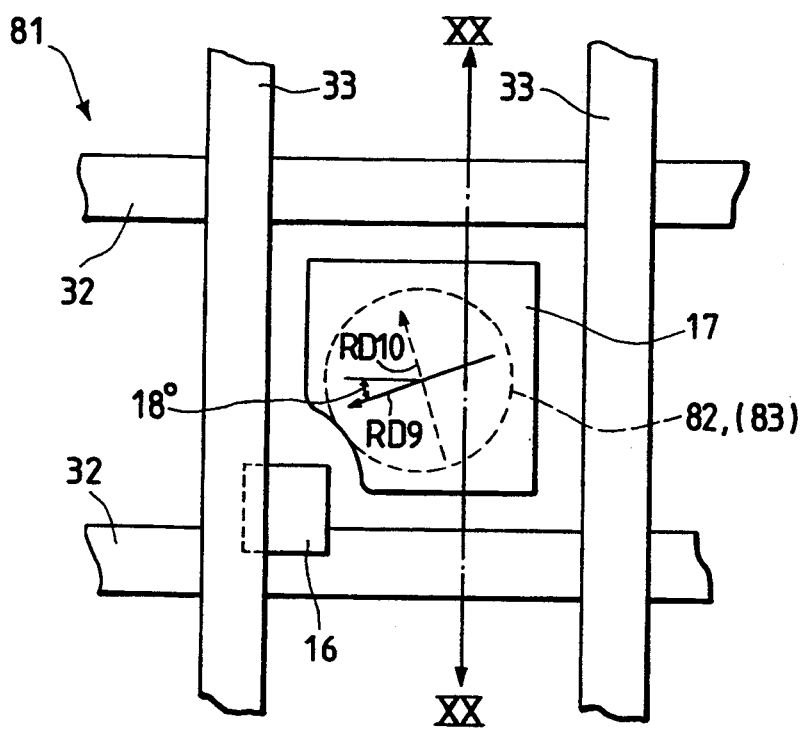
FIG. 19 is a plan view of a picture element arranged in a matrix type of twisted nematic liquid crystal display according to a fourth embodiment of the present invention.
Figure 20:
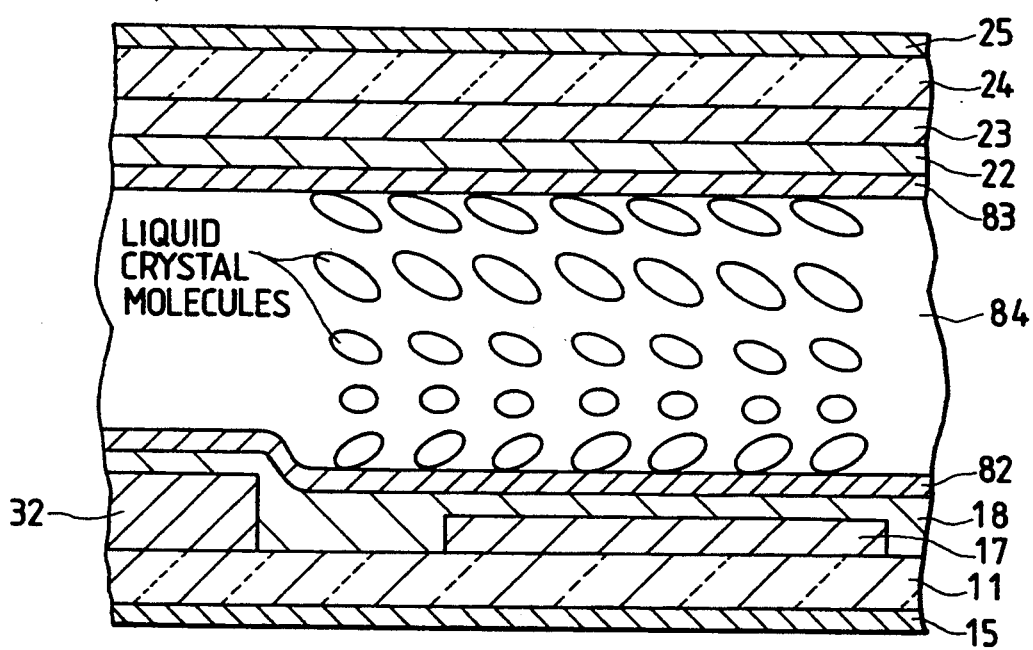
FIG. 20 is a sectional view of the picture element shown in FIG. 19, the sectional view being taken generally along the line XX—XX of FIG. 19.

FIG. 19 is a plan view of a picture element arranged in a matrix type of twisted nematic liquid crystal display according to a fourth embodiment of the present invention. FIG. 20 is a sectional view of the picture element shown in FIG. 19, the sectional view being taken generally along the line XX—XX of FIG. 19.

A matrix type of twisted nematic liquid crystal display according to a fourth embodiment, comprises a large number of picture elements 71 divided by the gate and source lines 32, 33 mounted on the array substrate 11, in the same manner as in the first embodiment shown in FIG. 7.

As shown in FIGS. 19, 20, each of picture elements 81 arranged in the twisted nematic liquid crystal display according to the fourth embodiment, comprises the gate line 32, the source line 33, the thin type of amorphous silicon transistor 16 connected with the gate and source lines 32, 33, the picture element electrode 17 connected with the source line 33 through the amorphous silicon transistor 16, the lower polarizer 15, the array substrate 11, the passivation film 18, a lower alignment layer 82 arranged over the picture element electrode 17, an upper alignment layer 83 arranged over the lower alignment layer 82 through a spacer formed of glass beads, a liquid crystal layer 84 in which mixed liquid crystal is filled up between the lower and upper alignment layers 82, 83, the common electrode 22, the colored filter 23, the opposite substrate 24, and the upper polarizer 25.

The lower alignment layer 82 and the upper alignment layer 83 are-respectively made of a polyimide alignment film A produced by Nissan Kagaku Inc. in Japan (products No. SE7311). Therefore, liquid crystal molecules are arranged on the lower and upper alignment layers 82, 83 at the pretilt angle PA1 of about 2 degrees.

The lower alignment layer 82 is rubbed in a rubbing direction RD9 which is inclined to the gate line 32 at 18 degrees in a counterclockwise direction, as shown in FIG. 16.

The upper alignment layer 83 is rubbed in a rubbing direction RD10 which is defined by turning the rubbing direction RD9 90 degrees in a clockwise direction, as shown in FIG. 16.

In the above configuration, each of the transistors 16 is turned on by receiving a pulse signal from one of the gate lines 32, so that an electric potential is applied to the picture element electrode 17 from the source line 33 through the transistor 16.

Next, the reason that the lower alignment layer 82 is rubbed in the rubbing direction RD9 is described.

Liquid crystal molecules in the liquid crystal layer 84 have an anisotropic dielectric constant in major axis directions thereof. Also, the liquid crystal molecules have another anisotropic dielectric constant in minor axis directions. Therefore, in cases where a liquid crystal molecule is set in a lateral electric field induced between the gate line 32 and the picture element electrode 17, an attractive-repulsive force exerted on the liquid crystal molecule depends on an angle between a major axis direction of the liquid crystal molecule and a direction of the lateral electric field. That is, the intensity of the attractive-repulsive force is proportional to a scalar product of the lateral electric field and the major axis of the liquid crystal molecule, in the same manner as the third embodiment.

Therefore, the scalar product sum F obtained according to the equation (1) is minimized in the fourth embodiment to minimize the adverse influence of the lateral electric field on the liquid crystal molecules in the liquid crystal layer 84.

The scalar product sum F mainly depends on the crossing angle $\theta(v)$ in the integrated region $Vo$ in which the intensity of the lateral electric field $E(vo)$ is high as compared with those in other integrated regions.

Also, an intensity distribution of the electric field in the liquid crystal layer 84 is determined by both an electric potential difference between the picture element electrode 17 and the gate line 32 and a three-dimensional structure of the picture element electrode 17 and the gate line 32.

The integrated region $Vo$ is generally positioned in a lower half region of the liquid crystal layer 84.

To determine rubbing directions of the lower and upper alignment layers 82, 83, a large number of experiments were implemented while the rubbing directions are changed many times. As a result of the experiments, it is ascertained that the generation of a reverse tilt disclination line is suppressed when the lower alignment layer 82 is rubbed in rubbing directions ranging within 30 degrees from the gate line 32, in cases where an electric voltage applied to the gate line 32 is as high as 10 V.

Figure 21:
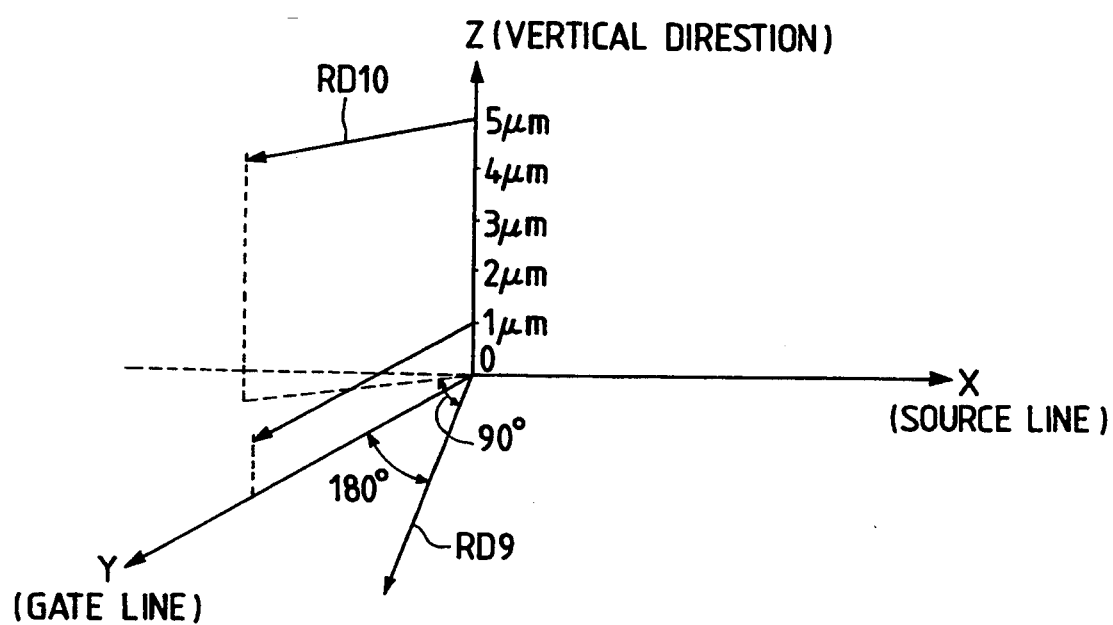
FIG. 21 explanatorily shows major axis directions of liquid crystal molecules gradually twisted in a clockwise direction along a vertical direction directed from a lower alignment layer to an upper alignment layer shown in FIG. 20.

Therefore, as shown in FIG. 21, a major axis direction of a liquid crystal molecule arranged in a standard position 1 $\mu$m higher than that of the lower alignment layer 82 is set to the same direction as the gate line 32. That is, because the major axes of the liquid crystal molecules are twisted 90 degrees in a clockwise direction along a vertical direction directed from the lower alignment layer 82 to the upper alignment layer 83, the rubbing direction RD9 of the lower alignment layer 82 is inclined to the gate line 32 at 18 degrees (18=90÷5) in a counterclockwise direction.

However, it is generally allowable that the rubbing direction of the lower alignment layer 82 be inclined to the gate line 32 at inclined angles ranging from 1 degree to 44 degrees. Also, in cases where the distance between the lower and upper alignment layers 82, 83 is about 5 $\mu$m, it is preferred that the rubbing direction of the lower alignment layer 82 be inclined to the gate line 32 at inclined angles ranging from 10 degrees to 30 degrees.

Next, a method for manufacturing the matrix type of twisted nematic liquid crystal display according to the fourth embodiment is briefly described.

The amorphous silicon transistor 16 is made in the array substrate 11 according to an epitaxial process conventionally utilized, and the gate and source lines 32, 33 and the picture element electrode 17 are made on the array substrate 11 according to a deposition process and an etching process conventionally utilized. Thereafter, the passivation film 18 is deposited over the entire array substrate 11 to insulate the picture element electrode 17 from the gate and source lines 32, 33. Therefore, the array substrate 11 on which the lower polarizer 15, the gate and source lines 32, 33, the amorphous silicon transistor 16, the picture element electrode 17, and the passivation film 18 are mounted is prepared.

Also, the opposite substrate 24 on which the commonelectrode 22, the colored filter 23, and the upper polarizer 25 is mounted is prepared.

Thereafter, the polyimide alignment film A is printed on the passivation film 18 according to a screen process printing. The thickness of the polyimide alignment film A printed is about 1000 angstroms.

Also, the polyimide alignment film A is printed on the common electrode 22 of the opposite substrate 24 according to the screen process printing. The thickness of the polyimide alignment film A printed is about 1000 angstroms.

Thereafter, the polyimide alignment films A printed on the passivation film 18 and the common electrode 22 are cured in an electric furnace.

Thereafter, an entire surface of the lower alignment layer 82 mounted on the array substrate 11 is rubbed in the rubbing direction RD9 with a piece of nylon fabric.

Thereafter, an entire surface of the upper alignment layer 83 mounted on the opposite substrate 24 is rubbed in the rubbing direction RD10 inclined at 90 degrees to the rubbing direction RD9 with the nylon fabric.

Thereafter, the opposite substrate 24 with the upper alignment layer 83 is attached on the array substrate 11 with the lower alignment layer 82 through a spacer made of glass beads to face the lower alignment layer 82 to the upper alignment layer 83. The distance between the lower and upper alignment layers 82, 83 is 5.0 μm.

Thereafter, the phenyl cyclohexane type of mixed liquid crystal (No. ZLI-2849 produced by Merck Inc. in Germany) is poured into a space between the lower and upper alignment layers 82, 83 in a vacuum atmosphere. A transition point of the mixed liquid crystal from a nematic liquid crystal phase to an isotropic liquid phase is 95° C.

Thereafter, the mixed liquid crystal poured is heated at a temperature of 110° C. to hold the mixed liquid crystal for 3 minutes at the temperature of 110° C. Therefore, the phase of the mixed liquid crystal becomes the isotropic liquid phase. Thereafter, the mixed liquid crystal is cooled at a room temperature. Therefore, the phase of the mixed liquid crystal is completely changed to the nematic liquid crystal phase so that the liquid crystal layer 84 is made of the mixed liquid crystal having the nematic liquid crystal phase.

As a result, the twisted nematic liquid crystal display of which the picture element 81 is shown in FIGS. 19, 20 is manufactured according to the fourth embodiment.

Thereafter, the nematic liquid crystal phase of the liquid crystal layer 84 is observed with a polarization microscope. External forms of the liquid crystal molecules are shown in FIG. 20 as the result of the observation with the polarization microscope.

As shown in FIG. 20, the major axes of the liquid crystal molecules in the liquid crystal layer 84 are oriented at the pretilt angle PA1 of about 2 degrees.

Also, the major axes of the liquid crystal molecules in the liquid crystal layer 84 are gradually *twisted in a clockwise direction like a spiral staircase along a vertical direction directed from the lower alignment layer 82 to the upper alignment layer 83. As a result, the major axes of the liquid crystal molecules are twisted 90 degrees between the lower and upper alignment layers 82, 83. The reason that the liquid crystal molecules is twisted 90 degrees in the clockwise direction is because the rubbing direction RD10 of the upper alignment layer 83 is inclined 90 degrees to the rubbing direction RD9 of the first lower alignment layer 82 in the clockwise direction.

Next, an operation executed in the matrix type of twisted nematic liquid crystal display according to the fourth embodiment is described.

In cases where any electric potential is not applied to the picture element electrode 17 because the transistor 16 is turned off, no vertical electric field is induced between the picture element electrode 17 and the common electrode 22. However, because a pulse signal is intermittently transmitted to the gate line 32, a lateral electric field is induced between the picture element electrode 17 and the gate line 32. In addition, the intensity of the lateral electric field is high because the electric voltage applied to the gate line 32 is as high as 10 V. Therefore, the lateral electric filed is concentrated on the edges of the picture element electrode 17.

In this case, a second lateral electric field is induced between the picture element electrode 17 and the source line 33. However, because the electric potential applied to the source line 33 is low as compared with the electric voltage applied to the gate line 32, the influence of the second lateral electric field on the liquid crystal molecules can be ignored.

When a pulse signal of which the electric voltage is almost 10 V is transmitted through the gate line 32, the intensity of the lateral electric field is increased. Particularly, the intensity of the lateral electric field at lower positions ranging from a height H3 of the lower alignment layer 72 to a height H4 higher than that of the lower alignment layer 72 by 2 μm is remarkably increased.

However, because the major axis directions of the liquid crystal molecules arranged at the lower positions ranging from the height H3 to the height H4 are almost parallel to the gate line 32, the major axes of the liquid crystal molecules are not changed in a vertical direction. Therefore, the liquid crystal molecules set in the normal tilt condition shown in FIG. 5 are not changed to the liquid crystal molecules set in the reverse tilt condition. Therefore, no reverse tilt condition is generated.

As a result, no tilt disclination line is generated over the entire liquid crystal molecules in the liquid crystal layer 84.

Accordingly, the contrast of the image displayed on the twisted nematic liquid crystal display according to the fourth embodiment is superior because no tilt disclination line is generated in the liquid crystal layer 84.

Also, because no tilt disclination line is generated in the liquid crystal layer 84, no black matrix is required so that the image can be displayed in a high brightness.

In the fourth embodiment, the major axes of the liquid crystal molecules are twisted 90 degrees in a clockwise direction along a vertical direction directed from the lower alignment layer 82 to the upper alignment layer 83. However, it is preferred that the major axes of the liquid crystal molecules be twisted almost 90 degrees on condition that the major axis directions of the liquid crystal molecules arranged at the lower positions ranging from the height H3 to the height H4 are almost parallel to the gate line 32.

Also, it is preferred that the liquid crystal be made of fluorinated liquid crystal materals (No. ZLI-5080 and ZLI-5091 produced by Merck Inc. in Germany).

7. Third Comparative Example

A third comparative example in which a matrix type of twisted nematic liquid crystal display is provided with a type of alignment layers is described to compare with the third and fourth embodiments.

Figure 22:
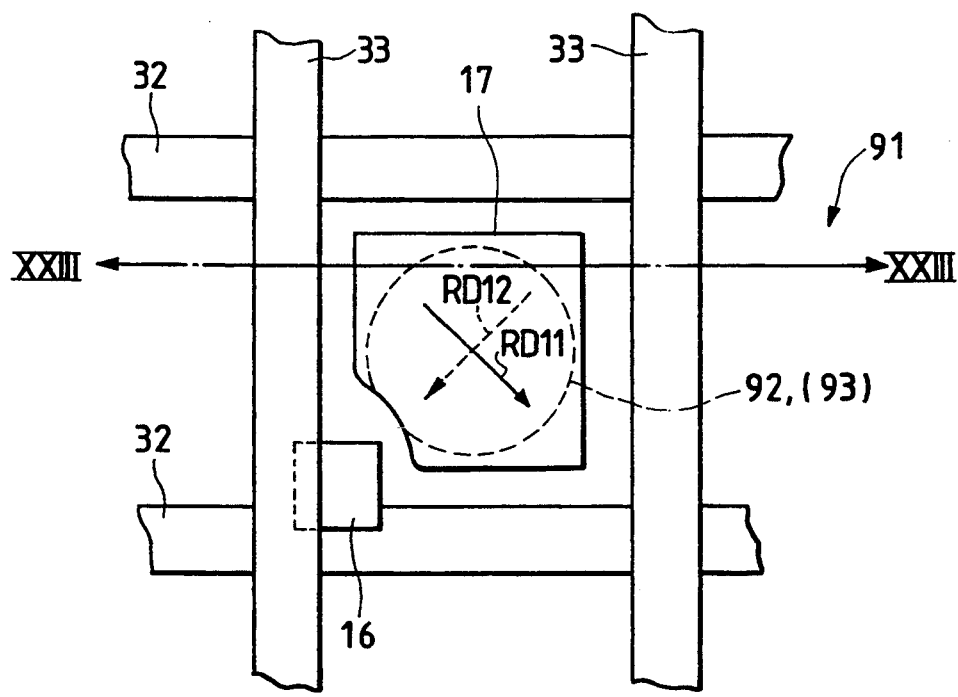
FIG. 22 is a plan view of a picture element arranged in a matrix type of twisted nematic liquid crystal display according to a third comparative example.
Figure 23:
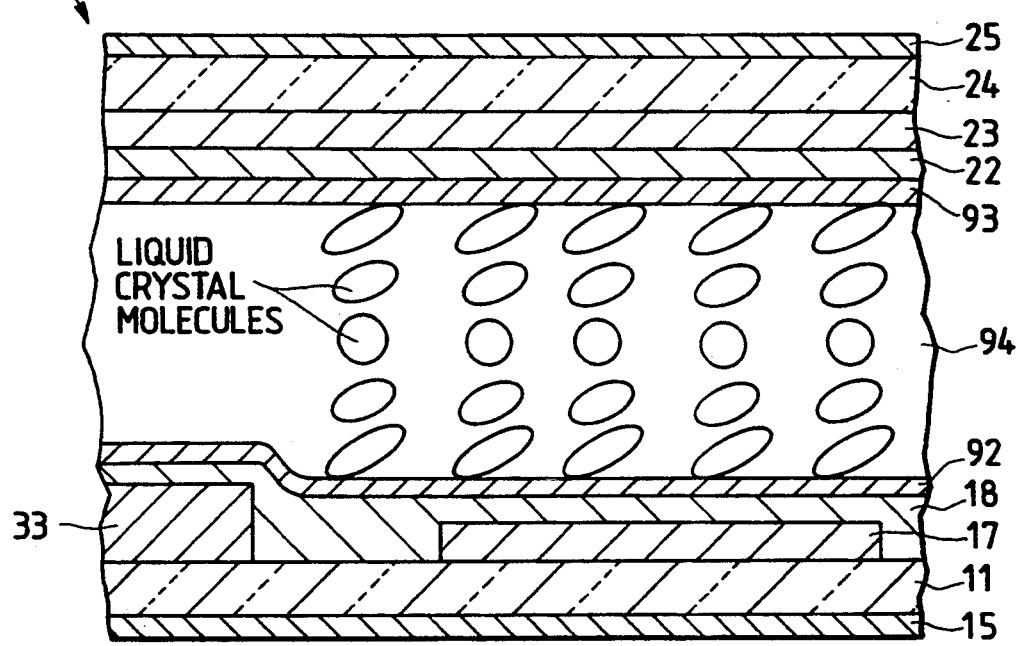
FIG. 23 is a sectional view of the picture element shown in FIG. 22, the sectional view being taken generally along the line XXIII—XXIII of FIG. 22.

FIG. 22 is a plan view of a picture element arranged in a matrix type of twisted nematic liquid crystal display according to the third comparative example. FIG. 23 is a sectional view of the picture element shown in FIG. 22, the sectional view being taken generally along the line XXIII—XXIII of FIG. 22.

As shown in FIGS. 22, 23, a picture element 91 arranged in a matrix type of twisted nematic liquid crystal display according to the third comparative example, comprises the gate line 32, the source line 33, the thin type of amorphous silicon transistor 16 connected with the gate and source lines 32, 33, the picture element electrode 17 connected with the source line 33 through the amorphous silicon transistor 16, the lower polarizer 15, the array substrate 11, the passivation film 18, a lower alignment layer 92 arranged on the entire passivation film 18, an upper alignment layer 93 arranged over the lower alignment layer 92 through a spacer (not shown) formed of glass beads, a liquid crystal layer 94 in which mixed liquid crystal is filled up between the lower and upper alignment layers 92, 93, the common electrode 22, the colored filter 23, the opposite substrate 24, and the upper polarizer 25.

The lower alignment layer 92 and the upper alignment layer 93 are respectively made of the polyimide alignment film A produced by Nissan Kagaku Inc. in Japan (products No. SE7311). Therefore, a liquid crystal molecule is arranged on the lower alignment layer 52 at the pretilt angle PA1 of about 2 degrees.

Next, a method for manufacturing the matrix type of twisted nematic liquid crystal display according to the third comparative example is briefly described.

The array substrate 11 on which the lower polarizer 15, the gate and source lines 32, 33, the amorphous silicon transistor 16, the picture element electrode 17, and the passivation film 18 are mounted is prepared.

Also, the opposite substrate 24 on which the common electrode 22, the colored filter 23, and the upper polarizer 25 is mounted is prepared.

Thereafter, the polyimide alignment film A is printed on the passivation film 18 according to the screen process printing. The thickness of the polyimide alignment film A printed is about 1000 angstroms.

Also, the polyimide alignment film A is printed on the common electrode 22 of the opposite substrate 24 according to the screen process printing. The thickness of the polyimide alignment film A printed is about 1000 angstroms.

Thereafter, the polyimide alignment films A printed on the passivation film 18 and the common electrode 22 are cured in an electric furnace.

Thereafter, an entire surface of the lower alignment layer 92 mounted on the array substrate 11 is rubbed in a rubbing direction RD11 with a piece of nylon fabric, according to a conventional rubbing process. The rubbing direction RD11 is inclined to the source line 32 at 45 degrees in a counterclockwise direction.

Thereafter, an entire surface of the upper alignment layer 93 mounted on the opposite substrate 24 is rubbed in a rubbing direction RD12 inclined at 90 degrees to the rubbing direction RD11 with the nylon fabric, according to a conventional rubbing process. In this case, the rubbing direction RD12 is defined by turning the rubbing direction RD1 90 degrees in a clockwise direction.

Thereafter, the opposite substrate 24 with the upper alignment layer 93 is attached on the array substrate 11 with the lower alignment layer 92 through a spacer made of glass beads to face the lower alignment layers 92 to the upper alignment layer 93. The distance between the lower and upper alignment layers 92, 93 is 5.0 μm.

Thereafter, the phenyl cyclohexane type of mixed liquid crystal (No. ZLI-2849 produced by Merck Inc. in Germany) is poured into a space between the lower and upper alignment layers 92, 93 in a vacuum atmosphere.

Thereafter, the mixed liquid crystal poured is heated at a temperature of 110° C. to hold the mixed liquid crystal for 3 minutes at the temperature of 110° C. Thereafter, the mixed liquid crystal is cooled at a room temperature. Therefore, the liquid crystal layer 94 is made of the mixed liquid crystal having the nematic liquid crystal phase.

As a result, the twisted nematic liquid crystal display of which the picture element 91 is shown in FIGS. 22, 23 is manufactured according to the third comparative example.

Thereafter, the nematic liquid crystal phase of the liquid crystal layer 94 is observed with a polarization microscope. External forms of the liquid crystal molecules are shown in FIG. 23 as the result of the observation with the polarization microscope.

As shown in FIG. 23, the major axes of the liquid crystal molecules arranged on the lower alignment layer 92 are oriented at a pretilt angular PA1 of about 2 degrees.

Also, the major axes of the liquid crystal molecules are gradually twisted in a clockwise direction along a vertical direction directed from the lower alignment layer 92 to the upper alignment layer 93. As a result, the major axes of the liquid crystal molecules arranged in the entire liquid crystal layer 94 are twisted 90 degrees between the lower and upper alignment layers 92, 93.

In addition, the major axes of the liquid crystal molecules arranged in a middle height between the lower alignment layer 92 and the upper alignment layer 93 is oriented in the same direction as the source line 33.

Next, an operation executed in the matrix type of twisted nematic liquid crystal display according to the third comparative example is described.

In cases where any electric potential is not applied to the picture element electrode 17, no vertical electric field is induced between the picture element electrode 17 and the common electrode 22. However, the lateral electric field is always concentrated on the edges of the picture element electrode 17 in the same manner as in the third and fourth embodiments.

When the intensity of the electric potential applied to the source line 33 is increased to control the orientation displacement of the major axes of the liquid crystal molecules, liquid crystal molecules arranged at the lower positions ranging from the height H1 to the height H2 shown in FIG. 18 receive a strong attractive-repulsive force from the lateral electric field, and major axes of the liquid crystal molecules are forcibly oriented in a vertical direction because a crossing angle between each of the major axes of the liquid crystal molecules and the lateral electric field is comparatively high. As a result, liquid crystal molecules which are arranged adjacent to the edges of the picture element electrode 17 and are arranged at the lower positions are strongly set in the reverse tilt condition.

Thereafter, liquid crystal molecules set in the normal tilt condition which are arranged on the picture element electrode 17 and are positioned adjacent to the liquid crystal molecules set in the reverse tilt condition are weakly set to the reverse tilt condition one after another while the liquid crystal molecules strongly set in the reverse tilt condition are weakly reset in the reverse tilt condition.

Thereafter, when a vertical electric field is induced between the picture element electrode 17 and the common electrode 22, the major axes of the liquid crystal molecules which are arranged on the picture element electrode 17 and are weakly reset in the reverse tilt condition are vertically oriented. Also, when the vertical electric field is induced, the major axes of the liquid crystal molecules which are arranged on the picture element electrode 17 and are set in the normal tilt condition are also vertically oriented. Therefore, a tilt disclination line is generated between the liquid crystal molecules weakly set in the reverse tilt condition and the liquid crystal molecules set in the normal tilt condition.

Accordingly, even though the vertical electric field is induced, a piece of incident white light passing through liquid crystal molecules arranged adjacent to the reverse tilt disclination line is circularly polarized so that colored Night is radiated from the picture element 91. Therefore, the contrast of the image deteriorates.

As a result of a comparison between the third and fourth embodiments and the third comparative example, it is realized that the contrast of the image can be enhanced by initially orienting the axes of the liquid crystal molecules in an optimum direction.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. An active matrix type of twisted nematic liquid crystal display, comprising:
  an array substrate;
  an opposite substrate arranged over the array substrate;
  a gate line arranged on the array substrate for transmitting a pulse signal;
  a source line arranged on the array substrate for transmitting electric charges;
  a switching device which is turned on by the pulse signal transmitted from the gate line;
  a pixel electrode for holding the electric charges transmitted from the source line through the switching device in cases where the switching device is turned on;
  a lower alignment layer arranged on the array substrate to cover the pixel electrode, the lower alignment layer being rubbed in a first rubbing direction to tilt major axes of liquid crystal molecules arranged on the lower alignment layer at a pretilt angle in the first rubbing direction, the first rubbing direction being inclined to the source line at an included angle ranging from 1 degree to 44 degrees;
  a common electrode arranged on the opposite substrate for inducing an electric field between the common electrode and the pixel electrode in cases where the electric charges are held in the pixel electrode;
  an upper alignment layer arranged on the common electrode to face the lower alignment layer, the upper alignment layer being rubbed in a second rubbing direction to tilt major axes of liquid crystal molecules arranged on the upper alignment layer at the pretilt angle in the second rubbing direction, the second rubbing direction being almost perpendicular to the first rubbing direction, and an intermediate direction between the first and second rubbing directions being parallel to the source line;
  a liquid crystal layer arranged between the lower and upper alignment layers facing each other, liquid crystal molecules set in a nematic liquid crystal phase being filled up in the liquid crystal layer, major axes of the liquid crystal molecules being gradually twisted from the first rubbing direction to the second rubbing direction along a vertical direction directed from the lower alignment layer to the upper alignment layer, and the major axes of the liquid crystal molecules arranged in a reference position lower than a middle position between the lower alignment layer and the upper alignment layer being oriented in the intermediate direction parallel to the source line.

2. A twisted nematic liquid crystal according to claim 1 in which the second rubbing direction is perpendicular to the first rubbing direction.

3. A twisted nematic liquid crystal according to claim 1 in which the first rubbing direction is inclined to the source line at a preferable inclined angle ranging from 10 degrees to 30 degrees.

4. A twisted nematic liquid crystal according to claim 1 in which a colored filter is mounted on the opposite substrate to change a piece of white light transmitting through the liquid crystal layer to a piece of colored light.

5. A twisted nematic liquid crystal according to claim 1 in which the lower and upper alignment layers are respectively made of a polyimide alignment layer on which the major axes of the liquid crystal molecules are tilted at the pretilt angle of several degrees.

6. A twisted nematic liquid crystal according to claim 1 in which the liquid crystal layer is formed of a phenyl cyclohexane type of mixed liquid crystal.

7. A twisted nematic liquid crystal according to claim 1 in which the liquid crystal layer is formed of fluorinated liquid crystal materials.

8. A twisted nematic liquid crystal according to claim 1 in which a lateral electric field induced between the pixel electrode and the source line is maximized at the reference position in which the major axes of liquid crystal molecules oriented in the intermediate direction parallel to the source line are arranged, a reverse tilt disclination line generated by a dipole-dipole interaction between each of the liquid crystal molecules and the lateral electric field being minimized.

9. An active matrix type of twisted nematic liquid crystal display, comprising:
  an array substrate;
  an opposite substrate arranged over the array substrate;
  a gate line arranged on the array substrate for transmitting a pulse signal;

a source line arranged on the array substrate for transmitting electric charges;

a switching device which is turned on by the pulse signal transmitted from the gate line;

a pixel electrode for holding the electric charges transmitted from the source line through the switching device in cases where the switching device is turned on;

a lower alignment layer arranged on the array substrate to cover the pixel electrode, the lower alignment layer being rubbed in a first rubbing direction to tilt major axes of liquid crystal molecules arranged on the lower alignment layer at a pretilt angle in the first rubbing direction, the first rubbing direction being inclined to the gate line at an inclined angle ranging from 1 degree to 44 degrees;

a common electrode arranged on the opposite substrate for inducing an electric field between the common electrode and the pixel electrode in cases where the electric charges are held in the pixel electrode;

an upper alignment layer arranged on the common electrode to face the lower alignment layer, the upper alignment layer being rubbed in a second rubbing direction to tilt major axes of liquid crystal molecules arranged on the upper alignment layer at the pretilt angle in the second rubbing direction, the second rubbing direction being almost perpendicular to the first rubbing direction, and an intermediate direction between the first and second rubbing directions being parallel to the gate line;

a liquid crystal layer arranged between the lower and upper alignment layers facing each other, liquid crystal molecules set in a nematic liquid crystal phase being filled up in the liquid crystal layer, major axes of the liquid crystal molecules being gradually twisted from the first rubbing direction to the second rubbing direction along a vertical direction directed from the lower alignment layer to the upper alignment layer, and the major axes of the liquid crystal molecules arranged in a reference position lower than a middle position between the lower alignment layer and the upper alignment layer being oriented in the intermediate direction parallel to the gate line.

10. A twisted nematic liquid crystal according to claim 9 in which the second rubbing direction is perpendicular to the first rubbing direction.

11. A twisted nematic liquid crystal according to claim 9 in which the first rubbing direction is inclined to the gate line at a preferable inclined angle ranging from 10 degrees to 30 degrees.

12. A twisted nematic liquid crystal according to claim 9 in which a colored filter is mounted on the opposite substrate to change a piece of white light transmitting through the liquid crystal layer to a piece of colored light.

13. A twisted nematic liquid crystal according to claim 9 in which the lower and upper alignment layers are respectively made of a polyimide alignment layer on which the major axes of the liquid crystal molecules are tilted at the pretilt angle of several degrees.

14. A twisted nematic liquid crystal according to claim 9 in which the liquid crystal layer is formed of a phenyl cyclohexane type of mixed liquid crystal.

15. A twisted nematic liquid crystal according to claim 9 in which the liquid crystal layer is formed of fluorinated liquid crystal materials.

16. A twisted nematic liquid crystal according to claim 9 in which a lateral electric field induced between the pixel electrode and the gate line is maximized at the reference position in which the major axes of liquid crystal molecules oriented in the intermediate direction parallel to the gate line are arranged, a reverse tilt disclination line generated by a dipole-dipole interaction between each of the liquid crystal molecules and the lateral electric field being minimized.

* * * * *